United States Patent
Konishi et al.

(10) Patent No.: US 8,300,944 B2
(45) Date of Patent: Oct. 30, 2012

(54) IMAGE PROCESSING METHOD, IMAGE PROCESSING APPARATUS, IMAGE READING APPARATUS, IMAGE FORMING APPARATUS, IMAGE PROCESSING SYSTEM, AND STORAGE MEDIUM

(75) Inventors: Yohsuke Konishi, Nara (JP); Atsuhisa Morimoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 938 days.

(21) Appl. No.: 12/367,285

(22) Filed: Feb. 6, 2009

(65) Prior Publication Data
US 2009/0202156 A1 Aug. 13, 2009

(30) Foreign Application Priority Data
Feb. 8, 2008 (JP) .................................. 2008-029676

(51) Int. Cl.
*G06K 9/46* (2006.01)
*G06K 9/62* (2006.01)

(52) U.S. Cl. ........................ 382/192; 382/190; 382/209

(58) Field of Classification Search ................. 382/192, 382/173, 190, 223, 266, 209; 707/999.1, 707/E17.02, 999; 358/403, 488, 3.03
See application file for complete search history.

(56) References Cited

U.S. PATENT DOCUMENTS

| | | | |
|---|---|---|---|
| 6,345,270 B1 | 2/2002 | Tanaka | |
| 6,389,178 B1 * | 5/2002 | Agazzi et al. | 382/276 |
| 6,640,009 B2 * | 10/2003 | Zlotnick | 382/224 |
| 7,233,945 B2 * | 6/2007 | Shiiyama | 1/1 |
| 8,107,734 B2 * | 1/2012 | Ohira et al. | 382/190 |
| 2002/0131642 A1 * | 9/2002 | Lee et al. | 382/220 |
| 2004/0243602 A1 * | 12/2004 | Shiiyama | 707/100 |
| 2007/0116363 A1 | 5/2007 | Iida | |
| 2008/0177764 A1 | 7/2008 | Kise et al. | |

FOREIGN PATENT DOCUMENTS

| | | |
|---|---|---|
| JP | 10-326212 A | 12/1998 |
| JP | 2001-273187 A | 10/2001 |
| JP | 2001-357045 A | 12/2001 |
| JP | 3488063 B2 | 1/2004 |
| JP | 2006-99341 A | 4/2006 |
| JP | 2006-332912 A | 12/2006 |
| JP | 2007-11472 A | 1/2007 |
| JP | 2007-141159 A | 6/2007 |
| JP | 2007-172195 A | 7/2007 |
| JP | 2007-280106 A | 10/2007 |
| WO | WO-2006/092957 A1 | 9/2006 |

* cited by examiner

*Primary Examiner* — Sheela Chawan
(74) *Attorney, Agent, or Firm* — Birch, Stewart, Kolasch & Birch, LLP

(57) ABSTRACT

An image processing system according to the present invention includes: a management server in which related information set with respect to reference image data is stored; a similarity determination process section for determining whether or not there is a similarity between input image data and the reference image data; a related information obtaining process section for obtaining related information from a related information storage section if the similarity determination process section determines that there is a similarity between the input image data and the reference image data; and a control section for adding the related information obtained to the input image data. With the arrangement, it becomes possible for the image processing system to add appropriate related information to inputted image data, so as to realize an accurate search for the image data on the basis of the related information.

15 Claims, 20 Drawing Sheets

FIG. 4
| -3 | -2 | -1 | 1  | -1 | -2 | -3 |
|----|----|----|----|----|----|----|
| -2 | -2 | 1  | 4  | 1  | -2 | -2 |
| -1 | 1  | 8  | 15 | 8  | 1  | -1 |
| 1  | 5  | 16 | 25 | 16 | 5  | 1  |
| -1 | 1  | 8  | 15 | 8  | 1  | -1 |
| -2 | -2 | 1  | 4  | 1  | -2 | -2 |
| -3 | -2 | -1 | 1  | -1 | -2 | -3 |
FIG. 5
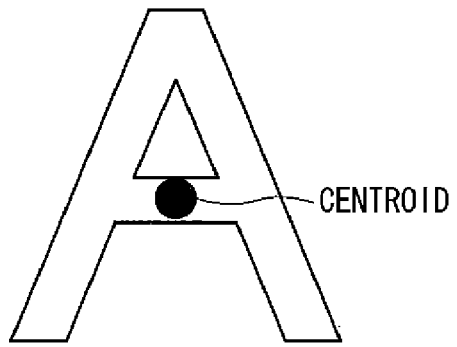
FIG. 6
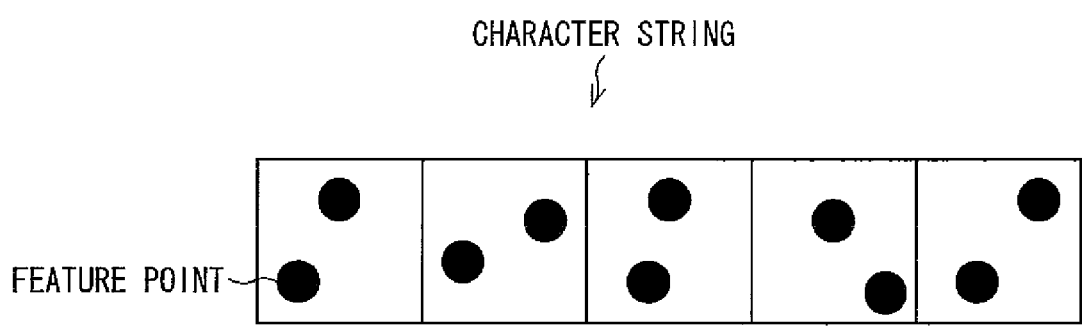

FIG. 11 (a)

| HASH VALUE | IMAGE INDEX |
|---|---|
| H1 | ID1 |
| H2 | ID1 |
| H3 | ID1、ID2 |
| H4 | ID1 |
| H5 | ID1 |
| H6 | ID1、ID2 |
| ⋮ | ⋮ |

FIG. 11 (b)

| HASH VALUE | IMAGE INDEX |
|---|---|
| H1 | ID1、ID1 |
| H2 | ID1 |
| H3 | ID1、ID2 |
| H4 | ID1 |
| H6 | ID1、ID2 |
| ⋮ | ⋮ |

| IMAGE INDEX | RELATED INFORMATION |
|---|---|
| ID1 | ESTIMATE SHEET |
| ID2 | APPROVAL DOCUMENT 1, PERSON IN CHARGE A |
| ID3 | APPROVAL DOCUMENT 2 |
| ⋮ | ⋮ |

| HASH VALUE | RELATED INFORMATION |
|---|---|
| H1 | ESTIMATE SHEET A |
| H2 | ESTIMATE SHEET A |
| H3 | ESTIMATE SHEET A APPROVAL DOCUMENT A |
| H4 | ESTIMATE SHEET A |
| H5 | ESTIMATE SHEET A |
| H6 | ESTIMATE SHEET A APPROVAL DOCUMENT A |
| ⋮ | ⋮ |

FIG. 21

| IMAGE INDEX | RELATED INFORMATION |
|---|---|
| ID1 | ESTIMATE SHEET A |
| ID3 | ESTIMATE SHEET B |
| ID4 | APPROVAL DOCUMENT A |
| ID10 | ESTIMATE SHEET C |

FIG. 23

| UPDATE DATE | BEFORE CHANGE | AFTER CHANGE |
|---|---|---|
| 2007/10/05 | ESTIMATE SHEET A | ESTIMATE SHEET B |
| 2007/10/14 | APPROVAL DOCUMENT A | APPROVAL DOCUMENT C |
| 2007/10/25 | ESTIMATE SHEET C | ESTIMATE SHEET A |
| ⋮ | ⋮ | ⋮ |

# IMAGE PROCESSING METHOD, IMAGE PROCESSING APPARATUS, IMAGE READING APPARATUS, IMAGE FORMING APPARATUS, IMAGE PROCESSING SYSTEM, AND STORAGE MEDIUM

This Nonprovisional application claims priority under 35 U.S.C. §119(a) on Patent Application No. 029676/2008 filed in Japan on Feb. 8, 2008, the entire contents of which are hereby incorporated by reference.

FIELD OF THE INVENTION

The present invention relates to: an image processing method; an image processing apparatus; an image reading apparatus; an image forming apparatus; an image processing system; and a storage medium, each of which adds related information to inputted image data so as to, for example, make it possible to search for the image data.

BACKGROUND OF THE INVENTION

In recent years, documents have been read by a scanner or the like, as image data, so as to be computerized and stored in a storage medium. For example, an invention disclosed in Patent Document 1 performs the following processing.

Index information inputted via a UI (user interface) is associated with region information of a computerized document for specifying a region, so as to be stored in an identification region database, for example. The region information indicates a target region when the document for specifying a region is OCRed (see Paragraph [0034] of Patent Document 1). Next, index data is created based on region selection information (such as information regarding a device that reads a target image of the OCR processing), which is inputted via an external UI or system. The region information corresponding to the index data (index information) is selected and obtained from among data stored in the identification region database (see Paragraph [0036] of Patent Document 1). Then, based on the region specified by the region information thus obtained, the document for specifying a region is OCRed.

As described above, in a case where image data is stored in a storage medium in document computerization processing, related information is usually added to image data, so as to search for the image data stored in the storage medium.

[Patent Document 1]
Japanese Unexamined Patent Publication No. 2007-141159 (Tokukai 2007-141159 (published on Jun. 7, 2007))
[Patent Document 2]
International Publication No. WO 06/092957 (published on Sep. 8, 2006)

In a case where several sorts of computerized image data, such as various application documents and contract documents, are stored in a storage medium, for example, there is a demand for a way to search for and extract the same sort of image data together at the same time. In such a case, it is necessary to add related information, which will be a keyword in the search for the image data, to the image data. The manual procedure for adding related information to each image data causes great inconvenience to a user. Meanwhile, as described in Patent Document 1, in a case where related information is created based on the information regarding a device for reading an image, the related information does not include information regarding a sort of the image data. This causes a problem that an accurate search for image data can not be realized.

SUMMARY OF THE INVENTION

An object of the present invention is to provide: an image processing method; an image processing apparatus; an image reading apparatus; an image forming apparatus; an image processing system; and a storage medium, each of which makes it possible to add appropriate related information, such as related information based on a sort of an image indicated by image data, to inputted image data, so as to realize an accurate search for each image data on the basis of the related information.

An image processing apparatus of the present invention includes: related information storage means in which (i) related information set with respect to reference image data is stored, and (ii) in a case where the related information has been changed, change history information indicating that change history is stored; a determination section for determining whether or not there is a similarity between input image data and the reference image data; a related information obtaining section for obtaining the related information from the related information storage means in a case where the determination section determines that there is a similarity between the input image data and the reference image data; a related information adding section for adding the related information obtained by the related information obtaining section to the input image data; and related information updating section for updating, based on the change history information, related information of the input image data to which related information has been added by the related information adding section.

Further, an image processing method of the present invention includes the steps of: (a) determining whether or not there is a similarity between input image data and reference image data; (b) obtaining, when the similarity between the input image data and the reference image data exists in the step (a), related information from related information storage means in which (i) related information set with respect to reference image data is stored, and (ii) in a case where the related information has been changed, change history information indicating that change history is stored; (c) adding the related information obtained in the step (b) to the input image data; and (d) updating, based on the change history information, related information of the input image data to which related information has been added in the step (c).

With the arrangement, the determination section (determination step) determines whether or not there is a similarity between the input image data and the reference image data. If the determination section determines that there is a similarity between the input image data and the reference image data, the related information obtaining section (related information obtaining step) obtains the related information from the related information storage section in which the related information set with respect to the reference image data is stored. The related information adding section (related information adding step) adds the related information thus obtained to the input image data.

Thereby, it becomes possible to add appropriate information, such as related information based on a sort of an image indicated by the image data, to inputted image data. Accordingly, it becomes possible to realize an accurate search for each image data on the basis of the related information.

Further, if the related information stored in the related information storage section is changed, the related information updating section updates, based on the change history information indicating a change history, the related information of the input image data to which the related information has been added by the related information adding section.

Thus, even if the related information stored in the related information storage section is changed, it is possible to reflect the change to the related information of the input image data to which the related information has been added. Therefore, it becomes possible to search for, based on the related information which has been changed, the input image data to which the related information had been added before the related information stored in the related information storage section was changed.

Examples of document image data inputted into the image processing apparatus encompass: image data obtained in such a manner that a scanner reads a document; and image data created by inputting necessary information into a format of electronic data by use of a computer (software). In other words, the image data is created in such a manner that an image printed or written on paper is computerized, or alternatively, is directly created as electronic data (such as an electronic application form), for example.

BRIEF DESCRIPTION OF THE DRAWINGS

FIG. 4 is an explanatory view indicating a filter coefficient of a mixed filter included in an MTF process section illustrated in FIG. 3.

FIG. 5 is an explanatory view illustrating an example of a connected component extracted from binarized image data by the processing in the feature point calculation section illustrated in FIG. 1, and a centroid of the connected component.

FIG. 6 is an explanatory view illustrating an example of each centroid (feature point) of a plurality of the connected components that are extracted from a character string included in binarized image data, through the processing in the feature point calculation section illustrated in FIG. 1.

FIG. 9(a) is an explanatory view of an example of a combination of three feature points that can be selected from among four peripheral feature points extracted by the feature point extraction section, illustrating an example of a combination of three peripheral feature points b, c, and d with respect to a target feature point a.

FIG. 9(b) is an explanatory view illustrating an example of a combination of peripheral feature points b, c, and e with respect to the target feature point a.

FIG. 9(c) is an explanatory view illustrating an example of a combination of peripheral feature points b, d, and e with respect to the target feature point a.

FIG. 9(d) is an explanatory view illustrating an example of a combination of peripheral feature points c, d, and e with respect to the target feature point a.

FIG. 11(a) is an explanatory view showing a hash table created by a storage process section illustrated in FIG. 1.

FIG. 11(b) is an explanatory view showing the hash table shown in FIG. 11(a) in accordance with another embodiment.

FIG. 21 is an explanatory view showing that a management server illustrated in FIG. 20 manages image indexes and corresponding related information so that the image indexes and corresponding related information are associated with each other.

FIG. 23 is an explanatory view showing that the management server illustrated in FIG. 1 manages a change history of the related information.

DESCRIPTION OF THE EMBODIMENTS

First Embodiment

One embodiment of the present invention is described below with reference to the attached drawings.

Figure 1:
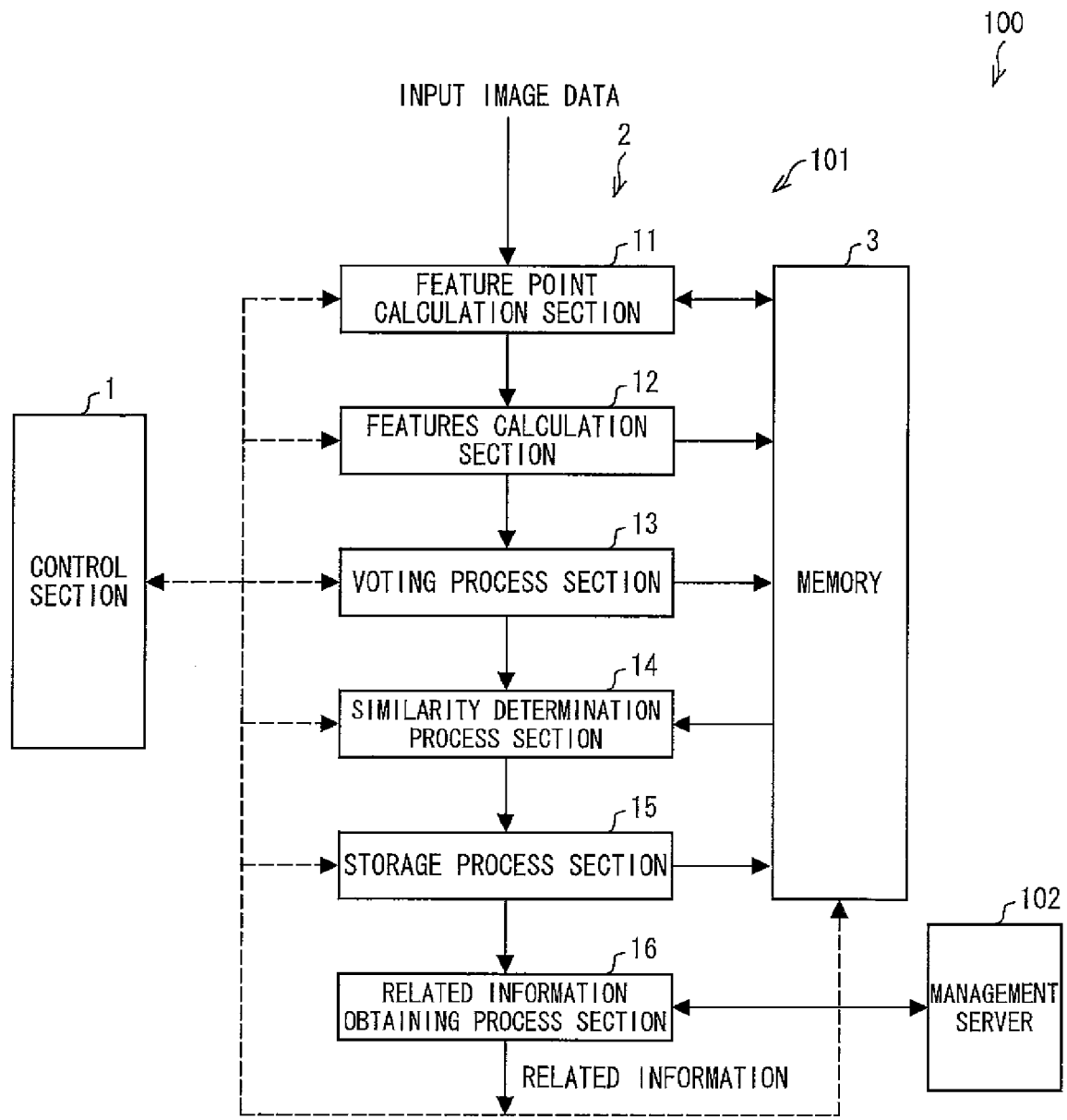
FIG. 1 is a block diagram illustrating an arrangement of an image processing system in accordance with an embodiment of the present invention.

FIG. 1 is a block diagram illustrating an arrangement of an image processing system 100 of the present embodiment. The image processing system 100 includes an image processing apparatus 101 and a management server (related information storage means, management apparatus) 102. The image processing apparatus 101 is provided to a digital color multifunction printer (image processing apparatus, image forming apparatus) 103 illustrated in FIG. 2, for example.

The image processing apparatus 101 processes input image data from outside. The input image data is, for example, image data obtained in such a manner that a document is read by a scanner, or image data created on an external device. In the processing, the image processing apparatus 101 compares input image data with reference image data stored in a memory (related information storage means) 3. If the input image data includes an image indicated by the reference image data, the image processing apparatus 101 adds related information set with respect to the reference image data to the input image data. The reference image data has a fixed form, such as various application documents, various contract documents, and various questionnaires. In this case, it is preferable that nothing is written on the fixed form of the reference image data, such as characters written by hand.

The image processing apparatus 101 includes a control section (related information adding section, display control section) 1, a document matching process section 2, and the memory (storage means) 3, as illustrated in FIG. 1.

The document matching process section 2 includes: a feature point calculation section (features extraction section) 11; a features calculation section (features extraction section) 12; a voting process section (determination section, similarity determination section) 13; a similarity determination process section (determination section, similarity determination section) 14; a storage process section 15; and a related information obtaining process section (related information obtaining section) 16.

Figure 3:
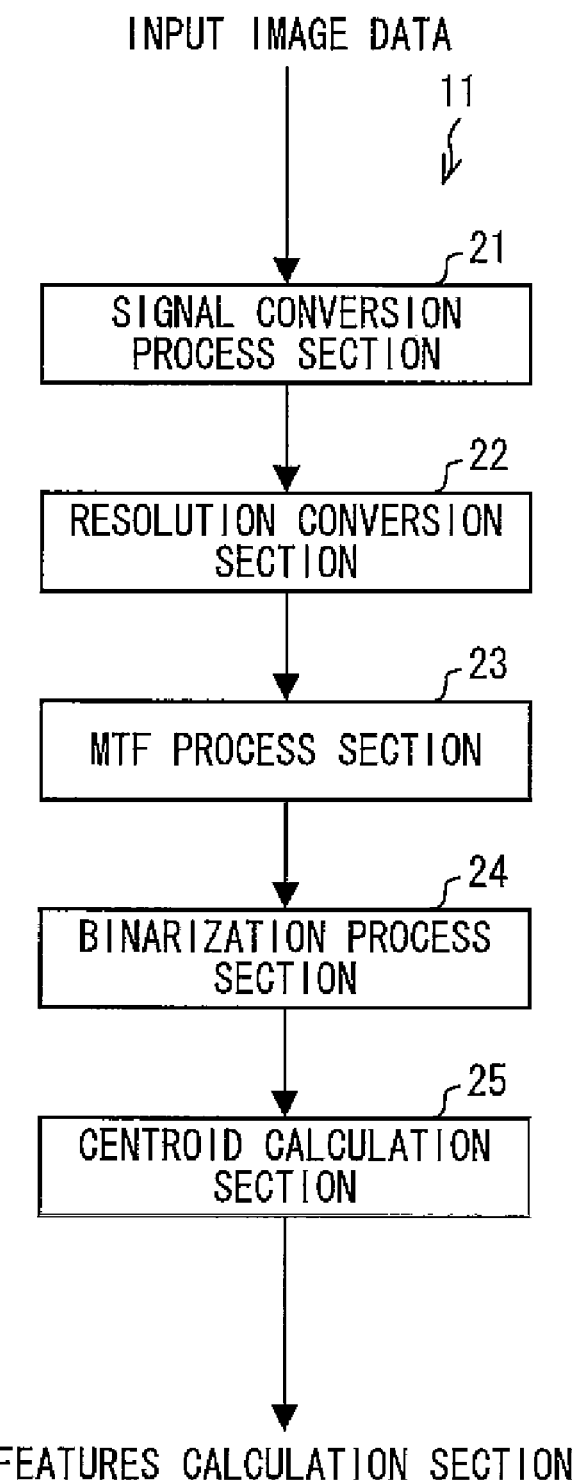
FIG. 3 is a block diagram illustrating an arrangement of a feature point calculation section illustrated in FIG. 2.

The feature point calculation section 11 extracts a connected component of a character string or a ruled line of input image data, and calculates a centroid of the connected component as a feature point. FIG. 3 is a block diagram illustrating an arrangement of the feature point calculation section 11. The feature point calculation section 11 includes a signal conversion process section 21, a resolution conversion section 22, an MTF process section 23, a binarization process section 24, and a centroid calculation section 25, as illustrated in FIG. 3.

The signal conversion process section 21 achromatizes input image data to converts the input image data into a lightness signal or a luminance signal, in a case where the input image data, such as standard image data or reference image data, is a color image. A luminance Y is found by use of the following formula, for example.

$$Y_j = 0.30R_j + 0.59G_j + 0.11B_j$$

$Y_j$: luminance value of each pixel
$R_j$, $G_j$, $B_j$: color component of each pixel The processing of the signal conversion process section 21 is not limited to the method of using the formula. The processing may be carried out by converting RGB signals into a CIE1976L*a*b* signal (CIE: Commission International de l'Eclairage, L*: lightness, a*, b*: chromaticity).

In a case where input image data has been scaled up/down optically by an image input apparatus, the resolution conversion section 22 scales up/down the input image data once again, so as to have a predetermined resolution. The image input apparatus may be a scanner for reading an image of a document and converting the image into image data. In a digital color copying machine illustrated in FIG. 2, the image input apparatus is a color image input apparatus (image input apparatus) 111.

Further, in order to reduce data processing throughput in a subsequent stage, the resolution conversion section 22 is also used to convert the resolution so as to make the resolution lower than a resolution in being scanned by the image input apparatus at an equal scale factor. For example, the resolution conversion section 22 converts image data read at 600 dpi (dot per inch) into 300 dpi image data.

Spatial frequency characteristics of an image input apparatus differ depending on a sort of the image input apparatus. The MTF process section 23 is used to absorb an influence caused by the differences. That is, in an image signal outputted from a CCD provided to the image input apparatus, MTF deterioration occurs due to: optical members such as a lens and a mirror; an aperture in a light receiving surface of the CCD; transfer efficiency; afterimage; a storage effect and scanning unevenness caused by physical scanning; and the like. The MTF deterioration causes the image thus read to be blurred. Therefore, the MTF process section 23 performs appropriate filter processing (enhancement processing) in order to recover the blur caused by the MTF deterioration. Further, the MTF process section 23 is also used to suppress an unnecessary high-frequency component in subsequent processing of the feature point extraction section 31 of the features calculation section 12. In other words, the MTF process section 23 performs an emphasizing process and a smoothing process by use of a mixed filter. FIG. 4 shows an example of a filter coefficient of the mixed filter.

The binarization process section 24 compares the luminance value (luminance signal) or lightness value (lightness signal) of the image data that is achromatized by the signal conversion process section 21, with a threshold value, so as to binarize the image data. The binarization process section 24 stores the image data thus binarized in the memory 3.

The centroid calculation section 25 carries out labeling (labeling process) with respect to each pixel of the image data (the binarized data is represented by "1" or "0", for example) binarized by the binarization process section 24. Then, the centroid calculation section 25 specifies a connected component which is constituted by a plurality of pixels that have the same label and are connected to each other. Next, a centroid of the specified connected component is extracted as a feature point, and outputted to the features calculation section 12.

The feature point can be expressed by coordinate values (x coordinates y coordinate) in a binarized image.

FIG. 5 is an explanatory view illustrating an example of a connected component extracted from binarized image data, and a centroid of the connected component. In FIG. 5, the connected component corresponding to a character "A", and the centroid of the connected component (feature point) are illustrated. Further, FIG. 6 is an explanatory view illustrating an example of each centroid (feature point) of a plurality of connected components extracted from a character string which is included in binarized image data.

Figure 7:
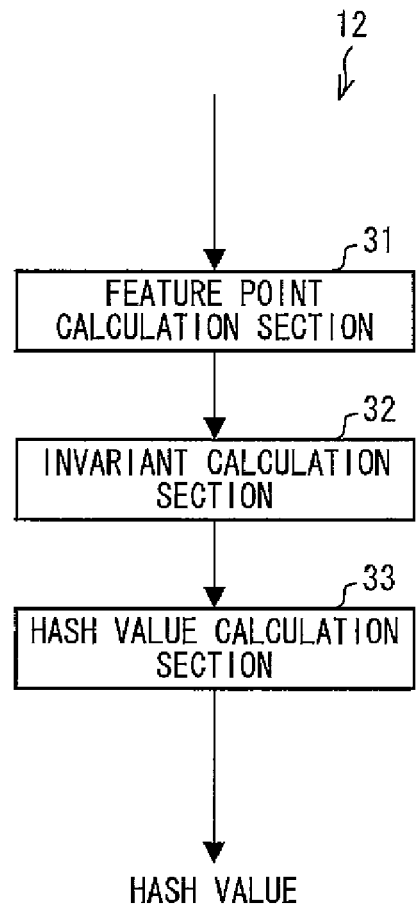
FIG. 7 is a block diagram illustrating an arrangement of a features calculation section illustrated in FIG. 1.

The features calculation section 12 (see FIG. 1) calculates features by use of the feature points calculated by the feature point calculation section 11. The features are an amount which is invariable relative to rotation, scaling up, and scaling down. In other words, the features are parameters which are invariable relative to geometric transformation including rotation, parallel shift, scaling up, and scaling down of an image. In order to calculate the features, feature points in the vicinity of a target feature point are selected and used. FIG. 7 is a block diagram illustrating an arrangement of the features calculation section 12. The features calculation section 12 includes a feature point extraction section 31, an invariant calculation section 32, and a hash value calculation section 33, as illustrated in FIG. 7.

In a case where there are a plurality of feature points calculated by the feature point calculation section 11 in image data, the feature point extraction section 31 regards only one feature point as a target feature point, and extracts peripheral feature points in the vicinity of the target feature point in such order that a feature point nearer to the target feature point is more preferentially extracted so as to extract a predetermined number of feature points. In an example illustrated in FIG. 8, the predetermined number is set to be four. In a case where a feature point a is regarded as the target feature point, four feature points b, c, d, and e are extracted as the peripheral feature points. Meanwhile, in a case where the feature point b is regarded as the target feature point, four feature points a, c, e, and f are extracted as the peripheral feature points.

Figure 9:
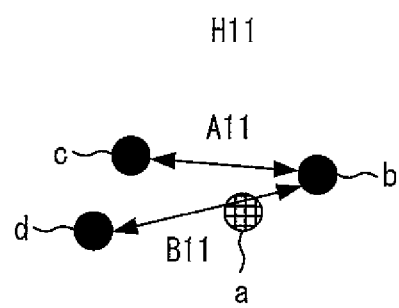
Figure 9:
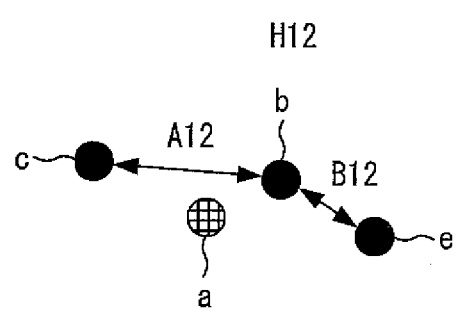
Figure 9:
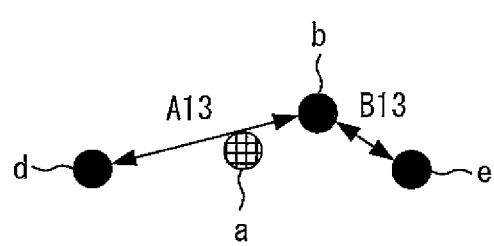
Figure 9:
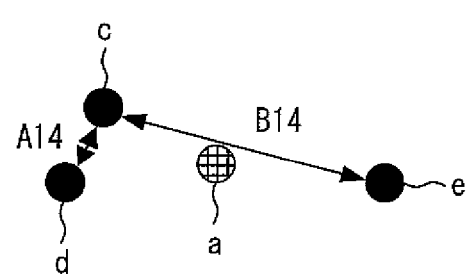
Figure 10:
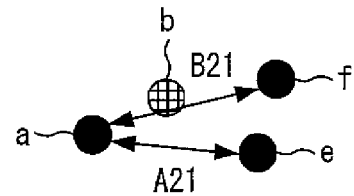
FIG. 10(a) is an explanatory view of an example of a combination of three peripheral feature points that can be selected from among four peripheral feature points extracted in the feature point extraction section in a case where a target feature point is switched over to one of the four peripheral feature points, illustrating an example of a combination of peripheral feature points a, e, and f with respect to the target feature point b.
FIG. 10(b) is an explanatory view illustrating an example of a combination of peripheral feature points a, e, and c with respect to the target feature point b.
FIG. 10(c) is an explanatory view illustrating an example of a combination of peripheral feature points a, f, and c with respect to the target feature point b.
FIG. 10(d) is an explanatory view illustrating an example of a combination of peripheral feature points e, f, and c with respect to the target feature point b.
Figure 10:
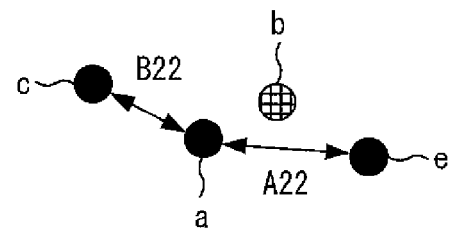
Figure 10:
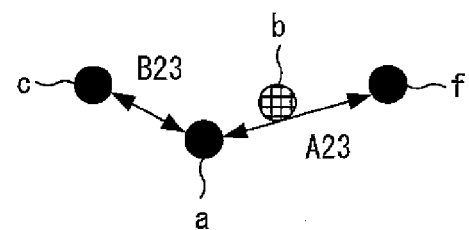
Figure 10:
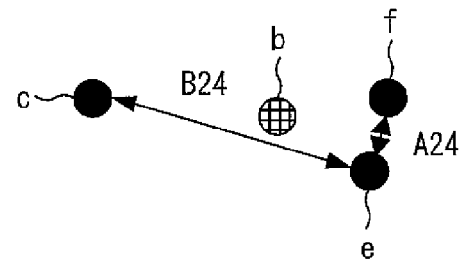

Further, the feature point extraction section 31 extracts combinations of three points that can be selected from among the four peripheral feature points extracted as described above. For example, as illustrated in FIGS. 9(*a*) through 9(*d*), in a case where the feature point a is regarded as the target feature point, combinations of three of the peripheral feature points b, c, d, and e, that is, a combination of peripheral feature points b, c, and d, a combination of peripheral feature points b, c, and e, a combination of peripheral feature points b, d, and e, and a combination of peripheral feature points c, d, and e are extracted.

For each of the combinations extracted by the feature point extraction section 31, the invariant calculation section 32 calculates an invariant (one of features) Hij which is invariable against geometric transformation.

Here, i is a number indicating a target feature point ("i" being an integral number being equal to or more than one), and j is a number indicating a combination of three peripheral feature points ("j" being an integral number being equal to or more than one). In the present embodiment, the invariant Hij is a ratio of lengths of two line segments from among line segments connecting two peripheral feature points with each other.

A length of the line segment can be calculated based on the coordinates of the peripheral feature points. For example, in FIG. 9(*a*), in a case where a length of a line segment connecting the feature point b to the feature point c is A11, and a length of a line segment connecting the feature point b to the feature point d with is B11, an invariant H11 is such that H11=A11/B11. Further, in FIG. 9(*b*), in a case where a length of a line segment connecting the feature points b to the feature point c is A12, and a length of a line segment connecting the feature point b to the feature point e is B12, an invariant H12 is such that H12=A12/B12. Furthermore, in FIG. 9(*c*), in a case where a length of a line segment connecting the feature point b to the feature point d is A13, and a length of a line segment connecting the feature point b to the feature point e is B13, an invariant H13 is such that H13=A13/B13. Moreover, in FIG. 9(*d*), in a case where a length of a line segment connecting the feature point c to the feature point d is A14, and a length of a line segment connecting the feature point c to the feature point e is B14, an invariant H14 is such that H14=A14/B14. Thus, in the examples illustrated in FIGS. 9(*a*) through 9(*d*), the invariants H11, H12, H13, and H14 are calculated.

In the examples described above, a line segment connecting a peripheral feature point that is closest to a target feature point, to another peripheral feature point that is second-closest to the target feature point, is Aij, and another line segment connecting the peripheral feature point that is closest to the target feature point, to another feature point that is third-closest to the target feature, is Bij. However, the present invention is not limited to this, and line segments used in the calculation of the invariant Hij can be selected by an arbitrary way.

The hash value calculation section 33 calculates a remainder of the following formula as a hash value (one of features) Hi, and stores the hash value thus calculated in a memory 3, for example.

$$Hi=(Hi1\times10^3+Hi2\times10^2+Hi3\times10^1+Hi4\times10^0)/D$$

In the formula, D is a constant number, which is set in advance depending on a range which is to be set as a remainder value range. For example, in a case where a quotient of Hi in the formula is "10", the remainder is in a range from "0" to "9". This is the range in which the hash value can be included. Further, i is a natural number representing the number of the feature points.

A method for calculating the invariant Hij is not particularly limited. For example, the invariant Hij of a target feature point may be a value calculated based on: a compound ratio of five points in the vicinity of the target feature point; a compound ratio of five points extracted from n points in the vicinity of the target feature point ("n" is a an integral number equal to or more than 5); an arrangement of m points ("m" is an integral number less than n, and equal to or more than 5) extracted from n points in the vicinity of the target feature point; or a compound ratio of five points extracted from the m points. The compound ratio is a value calculated from four points in a straight line or from five points on a plane, and is known as an invariant relative to projective transformation, which is a sort of geometrical transformation.

Further, a formula for calculating the hash value Hi is also not limited to the aforementioned formula, and another hash function (one of hash functions described in Patent Document 2, for example) may be used.

After finishing the extraction of peripheral feature points with respect to one target feature point, and calculation of the hash value Hi, each section of the features calculation section 12 switches over from the target feature point to another feature point, extracts peripheral feature points, and calculates a hash value. In this manner, each section of the features calculation section 12 calculates hash values corresponding to all the feature points.

Figure 8:
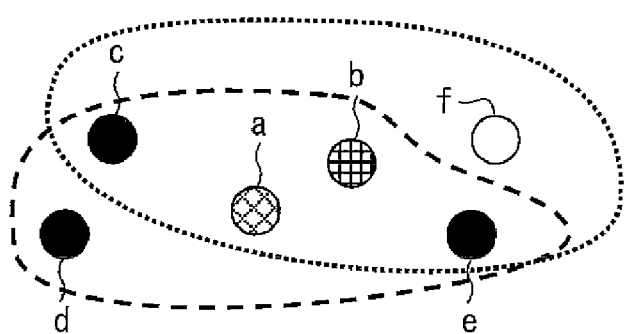
FIG. 8 is an explanatory view illustrating operation for extracting peripheral feature points with respect to a target feature point, in a feature point extraction section illustrated in FIG. 7.

In an example illustrated in FIG. 8, first, a target feature point is regarded as the feature point a, and the peripheral feature points are extracted to calculate a hash value. After that, the target feature point a is switched over to a feature point b, and the extraction of peripheral feature points and a hash value is newly started. In the example illustrated in FIG. 8, in a case where the feature point b is regarded as the target feature point, four feature points a, c, e, and f are extracted as the peripheral feature points.

Then, as illustrated in FIGS. 10(a) through 10(d), combinations of three points selected from among the peripheral feature points a, c, e, and f (that is, peripheral feature points a, e, and f, peripheral feature points a, e, and c, peripheral feature points a, f, and c, and peripheral feature points c, f, and c) are extracted, and a hash value corresponding to each of the combination is calculated. The calculated hash value is stored in the memory 3. Then, this processing is repeated for every feature point. The target feature point is switched over to every feature point, and the hash value is found for each switchover of the target feature point. Each hash value thus found is stored in the memory 3.

The aforementioned hash value is an example of features. The present invention is not limited to this, and another hash function can be used. In the above description, four points are extracted as peripheral feature points, but the number of the peripheral feature points is not limited to four. For example, it is possible to extract six peripheral feature points. In this case, a hash value may be found by: extracting five feature points from among the six feature points; and for each of six combinations for extracting five feature points, finding an invariant by extracting three feature points from among five feature points.

In a case where input image data is stored as reference image data in a storing mode, the features calculation section 12 sends the hash value (features) (calculated as described above) of each feature point of the input image data to the storage process section 15.

In the storing mode, the processing in the voting process section 13 and the similarity determination process section 14 is skipped (both of the sections do not carry out any processing). Meanwhile, in a matching mode for checking input image data against reference image data, the processing in the storage process section 15 is skipped.

The storage process section 15 carries out processing for storing only input image data stored as reference image data. In this processing, the image processing apparatus 101 is set to be in the storing mode. In the storing mode, input image data, i.e. reference image data, is processed in the feature point calculation section 11 and the features calculation section 12. The storage process section 15 stores an image index corresponding to the features (hash value) calculated in the features calculation section 12, as an image index of the reference image data. That is, the features (hash values) of reference image data differ depending on a sort of the reference image data, such as a sort of various application documents and contract documents. Therefore, it is possible to associate the features (hash value) with an appropriate image index.

As shown in FIG. 11(a), the storage process section 15 sequentially stores, in a hash table provided in the memory 3, both the hash value (calculated by the features calculation section 12) of each feature point, and an index (image IDk) indicating the image data. FIG. 11(a) shows that image data having image index ID1 includes the hash values H1, H2, H3, H4, H5, H6 . . . , and image data having image index ID2 includes the hash values H3, H6 . . . . There are cases where hash values are the same, for example, the same hash values H1 and H5 shown in FIG. 11(a). In this case, it is possible to unite the hash values H1 and H5 into one hash value, for example, H1, as shown in FIG. 11(b).

In order to select the storing mode, designate a reference image (reference image data), or select the matching mode, a user can operate the image processing apparatus 101 via an input operation section (not illustrated) connected to the control section 1 of the image processing apparatus 101. Alternatively, in a case where the image processing apparatus 101 is provided to the digital color multifunction printer (image forming apparatus) 103 illustrated in FIG. 2, a user can operate the image processing apparatus 101 via an operation panel (display means) 115.

Figures 12, 13:
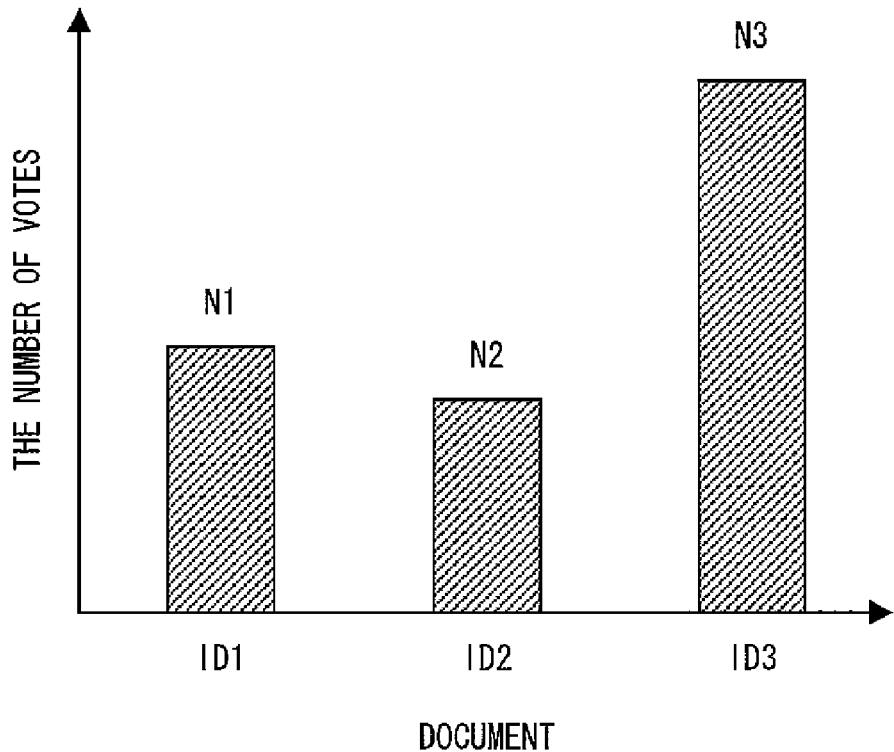
FIG. 12 is an explanatory view showing a plurality of reference image data that receive votes in operation of a voting process section illustrated in FIG. 1.
FIG. 13 is an explanatory view showing that a management server illustrated in FIG. 1 manages image indexes and corresponding related information so that the image indexes and corresponding related information are associated with each other.

In the matching mode for checking input image data against reference image data, the voting process section 13 compares features (hash values) calculated from the input image data by the features calculation section 12, with features (hash values) of a plurality of the reference image data stored in the hash table, and votes for the reference image data that has the same hash value as the input image data, as shown in FIG. 12.

FIG. 12 is a graph showing an example of the number of the votes received by the reference image data ID1, ID2, and ID3. In other words, the voting process section 13 counts, for each reference image data, the number of times that the hash value that is the same as the hash value of the reference image data is calculated from the input image data, and stores the number thus counted in the memory 3. In a case where the hash table shown in FIG. 11(b) is used, and the calculated hash values of input image data include the hash value H1, a document ID1 receives two votes.

The similarity determination process section 14 reads, out of the memory 3, an image index of each of the reference image data, and the number of the votes received by each of the reference image data (result of the processing in the voting process section 13). Then, the similarity determination process section 14 extracts the highest number of the votes, and the image index of the reference image data that receives the highest number of the votes. The image index thus extracted at this stage will be used to obtain related information in the related information obtaining process section 16.

Further, the similarity determination process section 14 uses the highest number of the votes thus extracted, as a value indicating a similarity. The similarity determination process section 14 compares the highest number of the votes with a predetermined threshold value TH, and determines whether or not there is a similarity, that is, determines whether or not the input image data includes the reference image data. Specifically, if the highest number of the votes is equal to or more than the predetermined threshold value TH, the similarity determination process section 14 determines that "there is a similarity (the input image data includes the reference image data)", and if the highest number of the votes is less than the threshold value TH, the similarity determination process section determines that "there is no similarity (the input image data includes no reference image data)".

In the present embodiment, for explanatory convenience, the features calculation section 12 calculates one hash value for one feature point (target feature point). However, the present invention is not limited to this, and a plurality of hash values can be calculated with respect to one feature point (target feature point). For example, it is possible to (i) extract six feature points as peripheral feature points with respect to a target feature point; and (ii) for each of six combinations for extracting five feature points from among the six feature points, calculate a hash value by finding an invariant by extracting three of five feature points. In this case, six hash values are calculated with respect to one feature point. The highest number of the votes used in the similarity determination process section 14 is represented such that the number of the feature points×a hash value calculated with respect to one feature point (target feature point).

If the similarity determination process section 14 determines that "there is a similarity" between input image data (first input image data) and reference image data (the input image data includes reference image data), the related information obtaining process section 16 sends an image index of the reference image data to the management server 102 so as to obtain, from the management server 102, related information associated with the image index thus sent. Then, the related information obtaining process section 16 outputs the related information.

The related information is information indicating a sort of the reference image data stored in the management server 102, or information related to the reference image data stored in the management server 102. As an example, in a case where image data of various documents, such as an estimate sheet, an approval document, an application document and a contract document, are stored, information indicating document names of such various documents are used as the related information.

The management server 102 is connected to the image processing apparatus 101 via a network. The management server 102 manages image indexes and corresponding related information so that image indexes are associated with corresponding related information respectively, as illustrated in FIG. 13. Further, the management server 102 sends, to the related information obtaining process section 16, the related information that corresponds to the image index at the request of the related information obtaining process section 16. FIG. 13 is an explanatory view showing an example of a relationship between image indexes and related information that corresponds to the image indexes respectively, both of which are managed by the management server 102.

When the management server 102 stores an image index, a setting of related information is carried out simultaneously. Alternatively, an image index has been stored in the management server 102 in advance, and afterward, related information is set to the image index. A user can set related information via an input operation section included in the management server 102, such as a keyboard. Alternatively, a user can set related information via the input operation section (not illustrated) connected to the control section 1 of the image processing apparatus 101. In this case, the image processing apparatus 101 communicates with the management server 102, and sends information thus inputted to the management server 102. Alternatively, in a case where the image processing apparatus 101 is provided to the digital color multifunction printer 103 illustrated in FIG. 2, a user can set related information via the operation panel 115.

The control section 1 controls each section of the document matching process section 2, and also document matching process section's access to the memory 3. Further, the control section 1 performs processing for embedding, in corresponding input image data (the first input image data), related information outputted from the related information obtaining process section 16.

Figure 14:
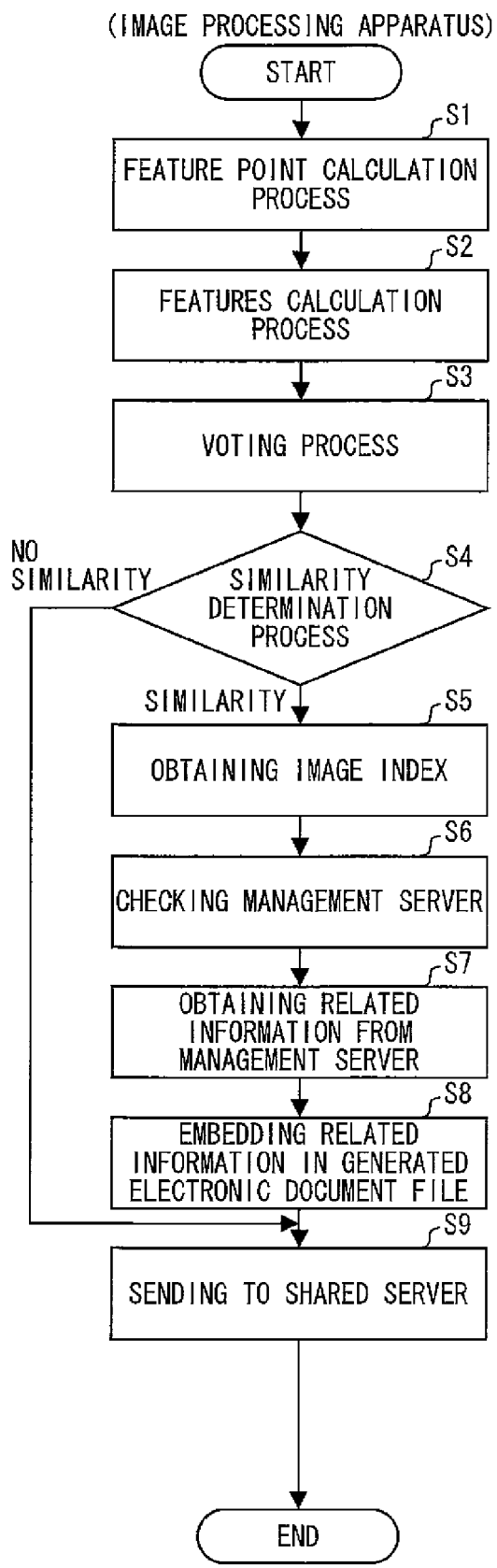
FIG. 14(a) is a flow chart illustrating operation of the image processing apparatus illustrated in FIG. 1 in a matching mode.
FIG. 14(b) is a flow chart illustrating operation of the management server illustrated in FIG. 1 in the matching mode.
Figure 14:
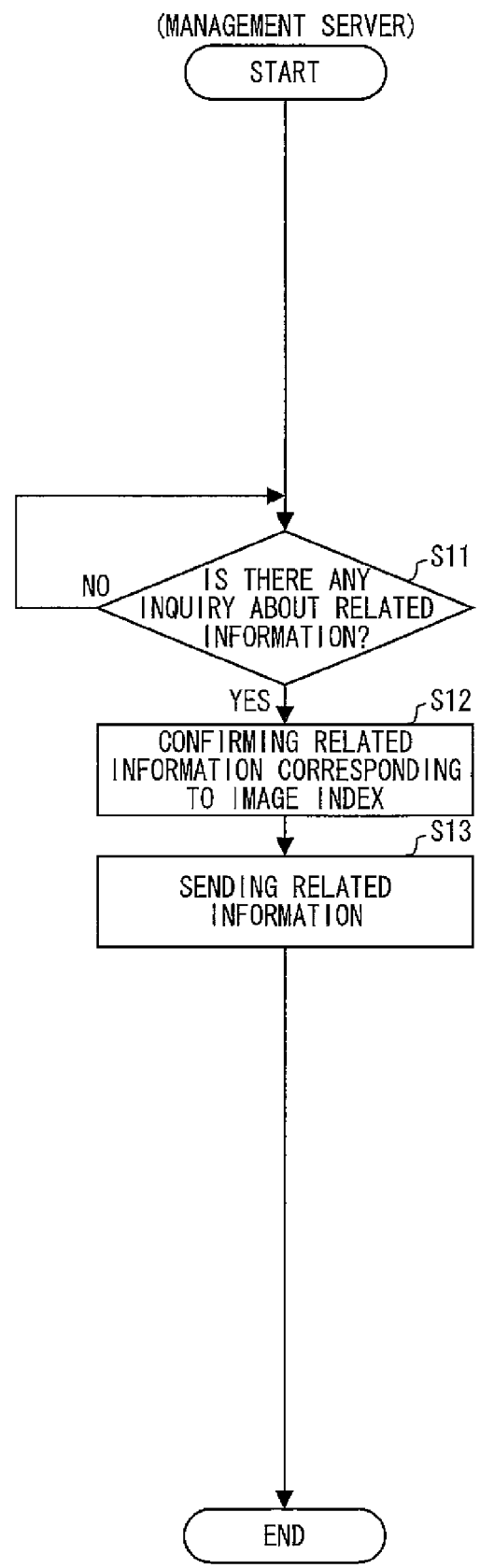

With the arrangement described above, the following explains operation of the image processing system 100 of the present embodiment in the matching mode with reference to flow charts of FIGS. 14(a) and 14(b). FIG. 14(a) is a flow chart illustrating the operation of the image processing apparatus 101 in the matching mode, and FIG. 14(b) is a flow chart illustrating the operation of the management server 102 in the matching mode.

As illustrated in FIG. 14(a), if the image processing apparatus 101 is set to be in the matching mode, the feature point calculation section 11 calculates each feature point of input image data (S1). Then, the features calculation section 12 calculates features of each of the feature points calculated by the feature point calculation section 11 (S2).

Next, the voting process section 13 compares the features (hash values) calculated by the features calculation section 12 with features (hash values) of a plurality of reference image data stored in the hash table included in the memory 3, and votes for reference image data that has the same features (hash value) as the input image data (S3).

After that, the similarity determination process section 14 extracts reference image data that has received the highest number of the votes, and determines whether or not the highest number of the votes is equal to or more than the threshold value TH, that is, determines whether or not there is a similarity between the input image data and the reference image data (whether or not the input image data includes the reference image data) (S4).

In the determination, if the similarity determination process section 14 determines that the highest number of the votes is less than the threshold value TH, that is, determines that there is no similarity between the input image data and the reference image data (the input image data includes no reference image data), the processing proceeds to S9. In this case, the input image data is determined as having no related information, so that no related information is embedded in the input image data, and the input image data is sent to a predetermined folder on a shared server (not illustrated).

On the other hand, in the determination of S4, if the similarity determination process section 14 determines that the highest number of the votes is equal to or more than the threshold value TH, that is, determines that there is a similarity between the input image data and the reference image data (the input image data includes the reference image data), an image index of the reference image data determined as being similar to the input image data is obtained from the memory 3 (S5).

Next, the related information obtaining process section 16 sends the image index obtained in S5 to the management server 102, so as to refer to the management server 102 to check whether or not there is related information corresponding to the image index (S6).

Then, as a result of S6, if the related information corresponding to the image index sent to the management server 102 is stored, and the management server 102 sends the related information to the related information obtaining process section 16, the related information obtaining section 16 outputs the related information (S7). It should be noted that it is possible to arrange such that a user is requested to input related information corresponding to the image index, in a case where there is no related information corresponding to the image index sent to the management server 102. In this case, with the arrangement in which the image processing apparatus 101 is provided to the digital color multifunction printer 103, a display section of the operation panel 115 is arranged to display the request that a user inputs the related information.

Next, the control section 1 embeds the related information outputted from the related information obtaining process section 16 in the input image data (S8). After that, the control section 1 sends the input image data to, for example, the shared server (not illustrated) (S9). The input image data is stored in a predetermined folder on the shared server. In this case, the input image data can be sorted out (filed) in accordance with either the image index, or the related information.

Meanwhile, the management server 102 determines whether or not there is an inquiry regarding the related information from the image processing apparatus 101, as illustrated in FIG. 14(b) (S11). If the management server 102 determines that there is such an inquiry, the management server 102 checks whether or not there is the related information corresponding to the image index sent from the image processing apparatus 101 (S12).

As a result, if there is the related information corresponding to the image index thus sent, the management server 102 sends the related information to the image processing apparatus 101 (S13).

The image processing system 100 carries out such processing with respect to every input image data inputted into the image processing apparatus 101. Therefore, it becomes possible to appropriately add related information that corresponds to the input image data to the input image data. Thereby, based on the related information, it becomes possible to accurately search for the image data (input image data) stored, for example, in the shared server.

Figure 15:
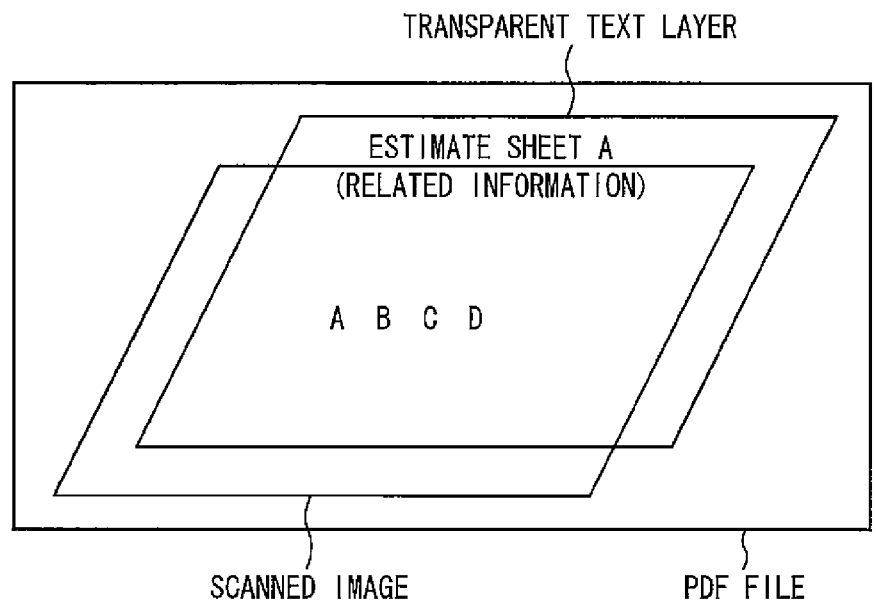
FIG. 15 is an explanatory view illustrating processing for embedding a transparent text into a PDF file (input image data), as related information, in the image processing apparatus illustrated in FIG. 1.
Figure 16:
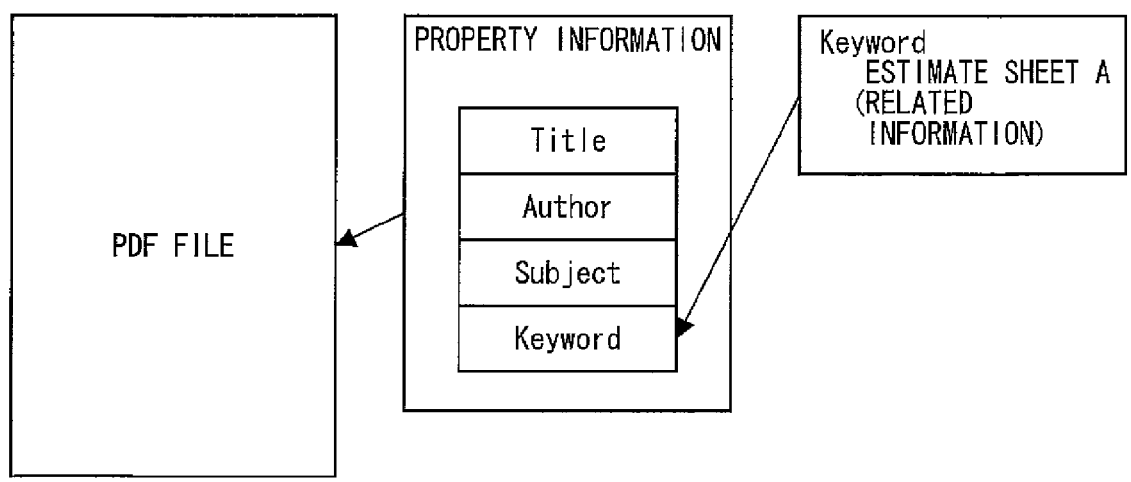
FIG. 16 is an explanatory view illustrating processing for storing related information in a region for storing keywords in a PDF file (input image data) in the image processing apparatus illustrated in FIG. 1.

Here, the following explains the processing for embedding related information in input image data with reference to FIGS. 15 and 16.

In the forma of a PDF file, information can be divided into a plurality of layers so as to be stored. Therefore, in a case where input image data is in the form of the PDF file, it is possible to insert related information in one layer as a transparent text, as illustrated in FIG. 15. Further, a PDF file can include a "document information dictionary" containing metadata. Therefore, in the case where the input image data is in the form of the PDF file, it is possible to store related information in a region for storing keywords in the document information dictionary, as illustrated in FIG. 16.

In the arrangement of the present embodiment, the management server 102 manages image indexes and related information so that the image indexes and corresponding related information are associated with each other. The related information obtaining process section 16 obtains the related information associated with the image index from the management server 102. However, it is possible to have another arrangement in which, without using the management server 102, (i) image index/related information associated information, which indicates a relationship between image indexes and corresponding related information, is stored in the memory 3 in advance, and (ii) the related information obtaining process section 16 obtains the related information from the memory 3.

Second Embodiment

The following explains another embodiment of the present invention with reference to the attached drawings.

An image processing apparatus 101 of the present embodiment does not use image indexes, and directly associates features (hash value) calculated by a features calculation section 12 with related information. Further, a management server 102 illustrated in FIG. 1 is not used in the arrangement of the present embodiment.

In the image processing apparatus 101 set to be in the storing mode, when image data is stored as reference image data, related information is set to reference image data simultaneously, for example. A user can operate an input operation section (not illustrated) connected to, for example, the control section 1, so as to store such reference image data and related information. Alternatively, in a case where the image processing apparatus 101 is provided to a digital color multifunction printer 103, a user can operate an operation panel 115 to perform the processing.

Figures 17, 18:
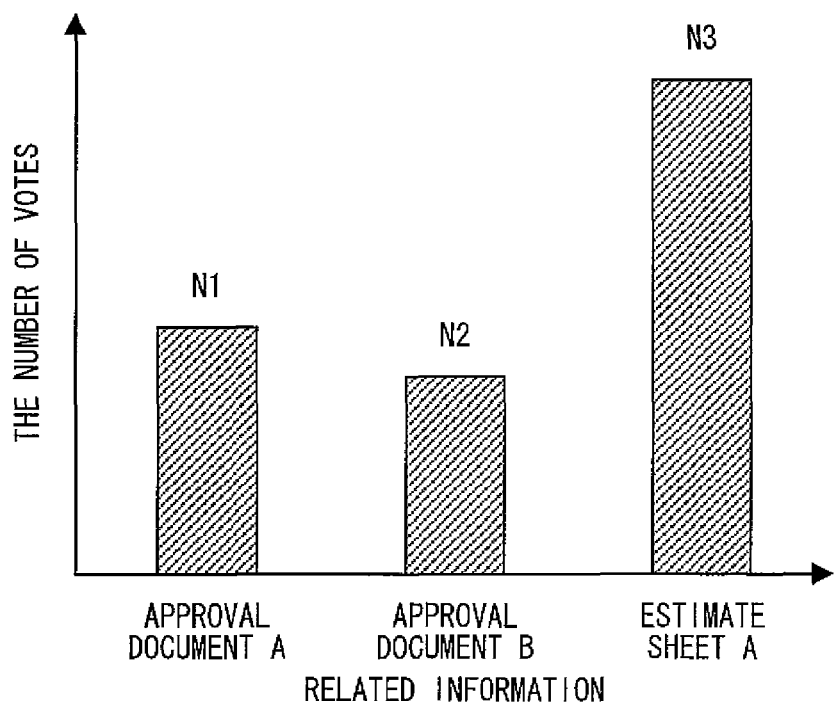
FIG. 17 is an explanatory view showing a hash table created by the storage process section illustrated in FIG. 1, in accordance with another embodiment of the present invention.
FIG. 18 is an explanatory view showing a plurality of reference image data that receive votes in operation of the voting process section illustrated in FIG. 1, in accordance with another embodiment of the present invention.

In the storing mode, reference image data is processed in a feature point calculation section 11 and the features calculation section 12. Then, in a storage process section 15, a hash value (calculated with respect to each feature point by the features calculation section 12) and related information are stored in a hash table provided to a memory 3, as illustrated in FIG. 17. It is possible to store the hash values and related information in the management server 102 in place of the memory 3.

In a matching mode for checking input image data against reference image data, a voting process section 13 compares features (hash values) calculated from the input image data in the features calculation section 12 with features (hash values) of a plurality of reference image data (related information) stored in the hash table. Then, the voting process section 13 votes for the reference image data (related information) that has the same hash value as the input image data, as illustrated in FIG. 18. FIG. 18 is a graph showing an example of the number of votes received by the reference image data (related information), that is, an approval document A, an approval document B, and an estimate sheet A. In the present embodiment, both the feature point calculation section 11 and the features calculation section 12 function as a features extraction section.

A similarity determination process section 14 reads the number of the votes (result of the processing of the voting process section 13) received by each reference image data (related information) out of the memory 3, and extracts the highest number of the votes from the numbers thus read. Further, the similarity determination process section 14 uses the highest number of the votes thus extracted as a similarity representing a similarity level. The similarity determination process section 14 compares the highest number of the votes with a threshold value TH which is set in advance, and determines whether or not there is a similarity between the input image data and the reference image data, that is, determines whether or not the input image data includes the reference image data. In the present embodiment, both the voting process section 13 and the similarity determination process section 14 function as a similarity determination section.

If the similarity determination process section 14 determines that "there is a similarity" between the input image data and the reference image data (related information) (the input image data includes the reference image data), a related information obtaining process section 16 obtains the related information from the memory 3, and outputs the related information.

Figure 19:
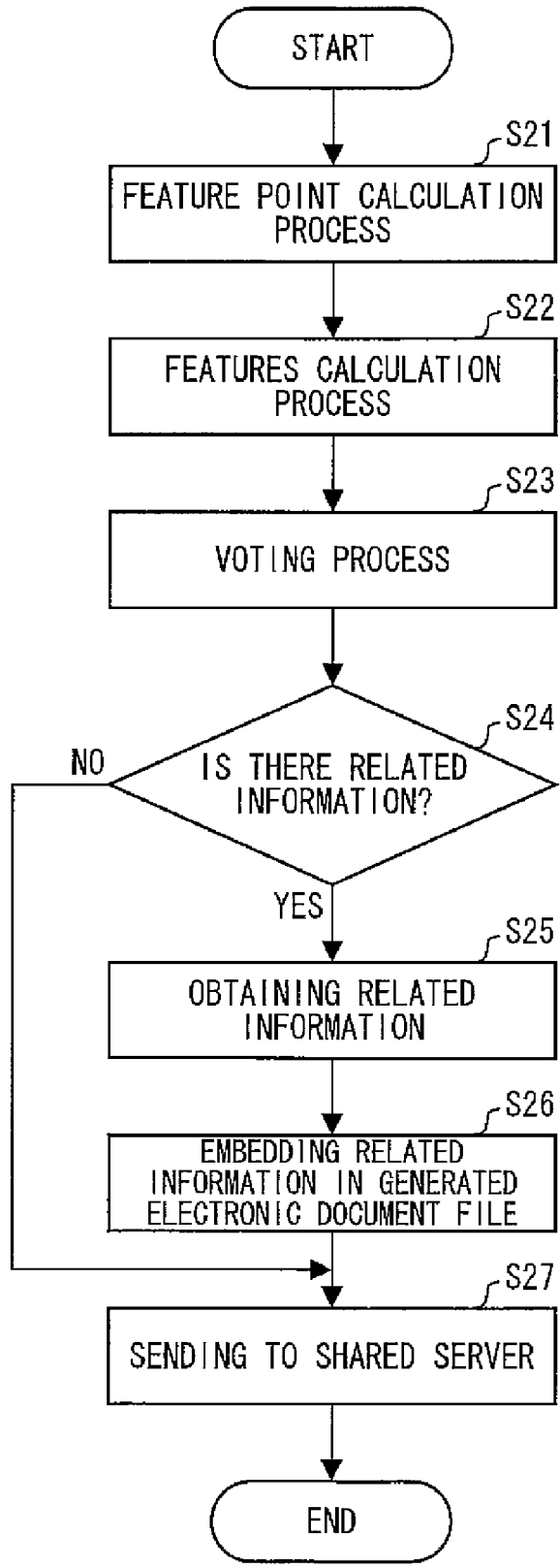
FIG. 19 is an explanatory view illustrating operation of the image processing apparatus in the matching mode in accordance with another embodiment of the present invention.

With the arrangement described above, the following explains operation of an image processing system 100 of the present embodiment in the matching mode with reference to FIG. 19. FIG. 19 is a flow chart illustrating the operation of the image processing apparatus 101 in the matching mode.

As illustrated in FIG. 19, if the image processing apparatus 101 is set to be in the matching mode, the feature point calculation section 11 calculates each feature point of input image data (S21). Then, the features calculation section 12 calculates features of each of the feature points calculated by the feature point calculation section 11 (S22).

Next, the voting process section 13 compares the features (hash values) calculated by the features calculation section 12, with features (hash values) of a plurality of reference image data (related information) stored in the hash table provided to the memory 3, and votes for reference image data (related information) that has the same features (hash value) as the input image data (S23).

After that, the similarity determination process section 14 extracts the reference image data (related information) that has received the highest number of the votes, and determines whether or not the highest number of the votes is equal to or more than the threshold value TH, that is, determines whether or not there is a similarity between the input image data and the reference image data (whether or not the input image data includes the reference image data) (S24).

In the determination, if the similarity determination process section 14 determines that the highest number of the votes is less than the threshold value TH, that is, determines that there is no similarity between the input image data and the reference image data (the input image data includes no reference image data), the processing proceeds to S27. In this case, the input image data is determined as having no related information, so that no related information is embedded in the input image data, and the input image data is sent to a predetermined folder on a shared server (not illustrated).

On the other hand, in the determination in S24, if the similarity determination process section 14 determines that the highest number of the votes is equal to or more than the threshold value TH, that is, determines that there is a similarity between the input image data and the reference image data (the input image data includes the reference image data), the related information obtaining process section 16 obtains the related information from the memory 3, and outputs the related information (S25).

Then, a control section 1 embeds the related information outputted from the related information obtaining process section 16 into the input image data (S26). Thereafter, the control section 1 sends the input image data to the predetermined folder on the shared server (not illustrated) (S27).

The processing described above is carried out with respect to every input image data inputted into the image processing apparatus 101, so that it becomes possible to appropriately add, to the input image data, related information that corresponds to the input image data. This realizes an accurate search for the image data (input image data) stored, for example, in the shared server, on the basis of the related information. The processing for embedding related information in input image data is the same as described above.

Third Embodiment

The following explains further another embodiment of the present invention with reference to the attached drawings.

Figure 20:
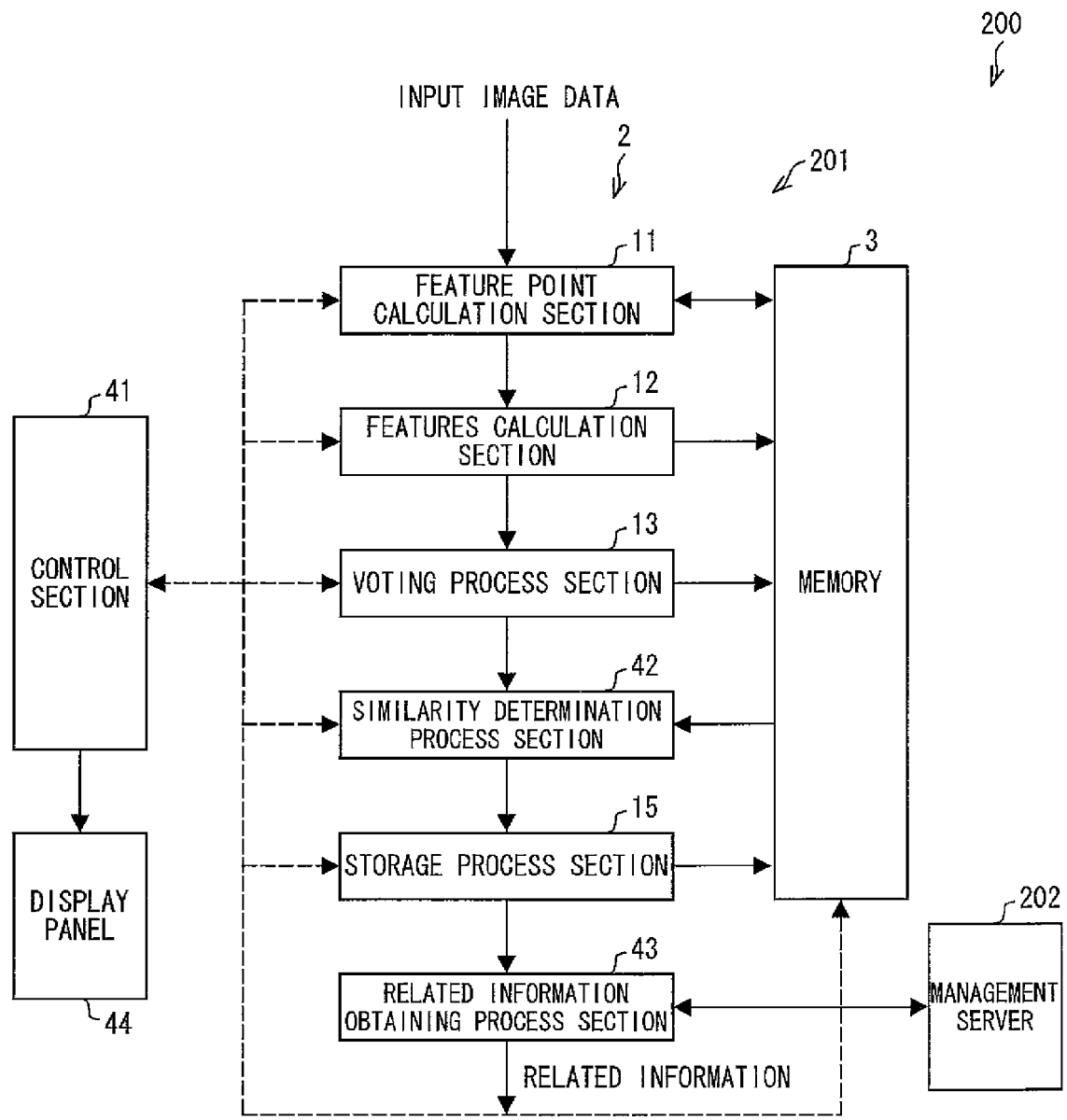
FIG. 20 is a block diagram illustrating an arrangement of an image processing system in accordance with still another embodiment of the present invention.

FIG. 20 is a block diagram illustrating an arrangement of an image processing system 200 of the present embodiment. The image processing system 200 includes an image processing apparatus 201 and a management server (related information storage means, management apparatus) 202. The image processing apparatus 201 includes a display panel (display means) 44. The image processing apparatus 201 also includes a control section (related information adding section, display control section, related information updating section) 41, a similarity determination process section (determination section, similarity determination section) 42, and a related information obtaining process section (related information obtaining section) 43, in place of the aforementioned control section 1, similarity determination process section 14, and related information obtaining process section 16. In a case where the image processing system 200 is provided to a digital color multifunction printer (image processing apparatus, image forming apparatus) 103 illustrated in FIG. 2, an operation panel 115 is used as an alternative to the display panel 44.

As in the arrangement illustrated in FIG. 1, in a storing mode, a storage process section 15 sequentially stores, in a hash table provided to a memory 3, a hash value of each feature point (calculated by a features calculation section 12) and indexes (image IDk) indicating image data, as shown in FIG. 11(a). A voting process section 13 performs the voting operation described above.

The similarity determination process section 42 reads, out of the memory 3, an image index of each reference image data and the number of the votes for each reference image data, both of which are a result of the processing of the voting process section 13. Then, the similarity determination process section 42 compares the reference image data with a threshold value TH, and determines whether or not there is a similarity, that is, determines whether or not there is a possibility that the input image data includes the reference image data. Specifically, if the number of the votes is equal to or more than the threshold value TH, the similarity determination process section 42 determines that there is a similarity (there is a possibility that the input image data includes the reference image data), and if the number of the votes is less than the threshold value TH, the similarity determination section 42 determines that there is no similarity (there is no possibility that the input image data includes the reference image data).

If the similarity determination process section 42 determines that there is a similarity, the related information obtaining process section 43 creates a list of the reference image data (image indexes) receiving such a result, that is, a candidate image index list. Further, the related information obtaining process section 43 sends the candidate image index list to the management server 202, and obtains, from the management server 202, related information associated with each image index on the candidate image index list thus sent. Then, the related information obtaining process section 43 creates a candidate related information list corresponding to the candidate image index list.

The control section 41 controls each section of a document matching process section 2, and simultaneously, controls document matching process section's access to the memory 3. Further, the control section 41 controls the display panel 44 to display the candidate related information list created by the related information obtaining process section 43. In this case, simultaneously, the control section 41 controls the display panel 44 to also display a request that a user selects one related information from among the related information on the candidate related information list. Furthermore, the control section 41 performs processing for embedding the related information thus selected in corresponding input image data (first input image data).

As in the image processing system 100 illustrated in FIG. 1, the management server 202 manages image indexes and related information so that the image indexes and corresponding related information are associated with each other, as shown in FIG. 21. Further, at the request of the related information obtaining process section 43, the management server 202 sends related information that corresponds to each of the image indexes to the related information obtaining process section 43. In this case, the management server 202 adds, to the candidate image index list provided from the related information obtaining process section 43, related information that corresponds to each of the image indexes on the candidate image index list, so as to create the candidate related information list. The management server 202 sends the candidate related information list to the related information obtaining process section 43.

Alternatively, the management server 202 may send related information that respectively corresponds to image indexes on the candidate image index list, to the related information obtaining process section 43, so that the related information obtaining process section 43 may create the candidate related information list. It should be noted that a way to set the image indexes or related information is the same as described above.

Figure 22:
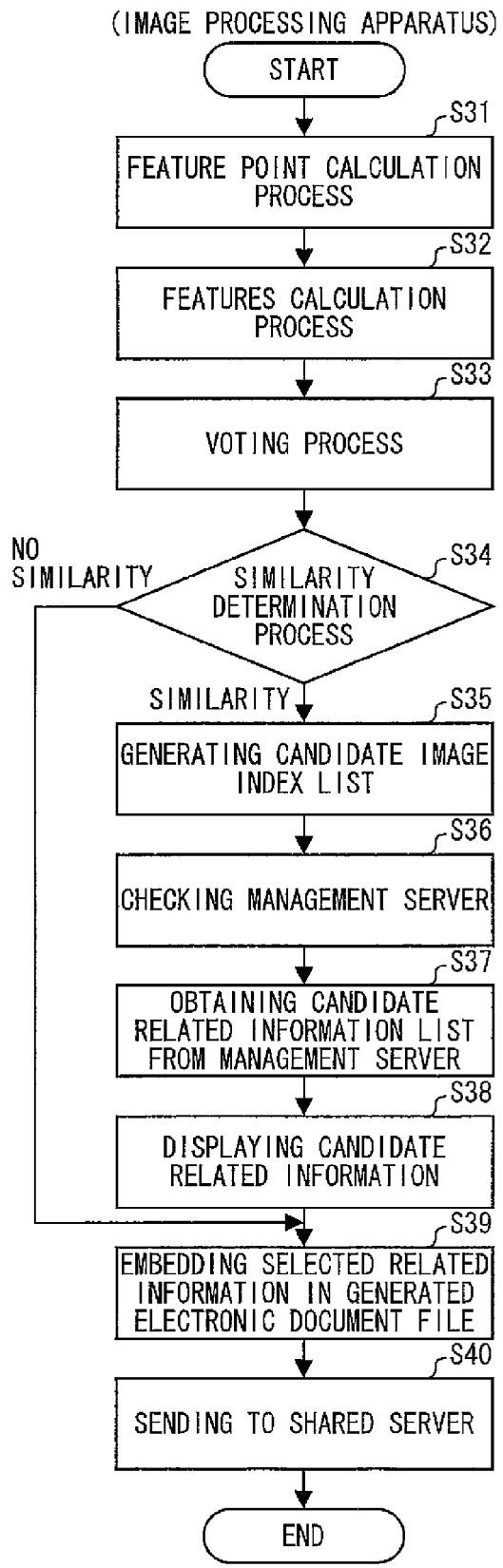
FIG. 22(a) is a flow chart illustrating operation of an image processing apparatus illustrated in FIG. 20 in the matching mode.
FIG. 22(b) is a flow chart illustrating operation of the management server illustrated in FIG. 20 in the matching mode.
Figure 22:
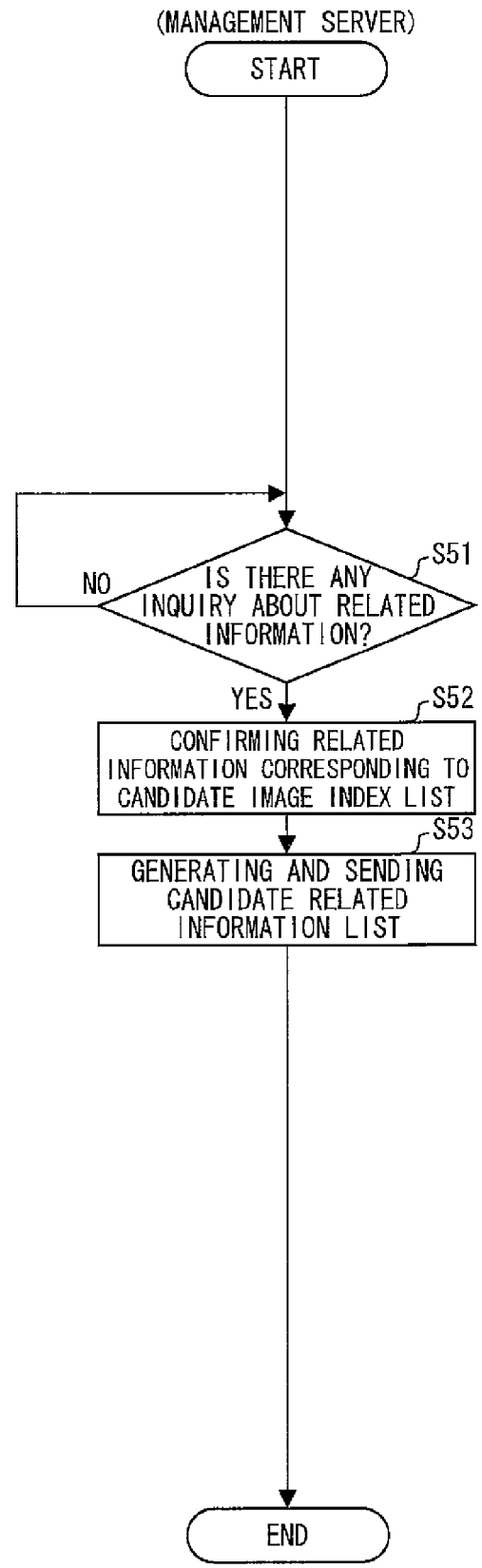

With the arrangement described above, the following explains operation of the image processing system 200 of the present embodiment in the matching mode with reference to flow charts of FIGS. 22(a) and 22(b). FIG. 22(a) is a flow chart showing operation of the image processing apparatus 201 in the matching mode, and FIG. 22(b) is a flow chart showing operation of the management server 202 in the matching mode.

As illustrated in FIG. 22(a), if the image processing apparatus 201 is set to be in the matching mode, a feature point calculation section 11 calculates each feature point of input image data (S31). Then, the features calculation section 12 calculates features of each feature point calculated by the feature point calculation section 11 (S32).

Next, the voting process section 13 compares the features (hash values) calculated by the features calculation section 12 with features (hash values) of a plurality of reference image data stored in the hash table provided to the memory 3, and votes for the reference image data having the same features (hash value) as the input image data (S33).

Next, the similarity determination process section 42 reads, out of the memory 3, the number of votes of each of the reference image data, and based on the number of the votes, determines whether or not there is a similarity between the input image data and the reference image data. In other words, the reference data that has received the votes equal to or more than a threshold value TH in number is extracted (S34).

In the determination, if the similarity determination processing section 42 determines that there is no reference data having the votes equal to or more than the threshold value TH, the processing proceeds to S39. In this case, the input image data is determined as having no related information, so that no related information is embedded in the input image data, and the input image data is sent to a predetermined folder on a shared server (not illustrated).

On the other hand, in the determination in S34, if the similarity determination process section 42 determines that there is reference image data that has received the votes equal to or more than the threshold value TH, the related information obtaining process section 43 obtains image indexes of these reference image data from the memory 3, and creates the candidate image index list of these reference image data (S35).

Next, the related information obtaining process section 43 sends the candidate image index list to the management server 202, so as to refer to the management server 202 to check whether or not there is the related information corresponding to the image indexes on the candidate image index list (S36).

After that, as a result of the inquiry, if the related information corresponding to the image indexes on the candidate image index list is stored on the management server 202, and the management server 202 sends the candidate related information list corresponding to the candidate image index list to the related information obtaining process section 43, the related information obtaining process section 43 outputs the candidate related information list (S37).

Then, the control section 41 controls the display panel 44 to display the candidate related information list outputted from the related information obtaining process section 43, and simultaneously, controls the display panel 44 to display a request that a user selects any of the related information on the candidate related information list (S38).

Next, if a user selects any of the related information and input the selection, the control section 41 carries out processing for embedding the related information thus selected in the input image data (first input image data) corresponding to the related information (S39). After that, the input image data is sent to, for example, the shared server (not illustrated) (S40). If a user does not selects any of the related information within a predetermined period, the processing of S39 and S40 is not performed, and the operation is finished.

Meanwhile, as illustrated in FIG. 22(b), the management server 202 determines whether or not there is an inquiry regarding the related information from the image processing apparatus 201, that is, determines whether or not the candidate image index list is sent from the image processing apparatus 201 (S51).

As a result of the determination, if the management server 202 determines that the candidate image index list is received, the management server 202 checks whether or not there is related information corresponding to each of the image indexes on the candidate image index list (S52). Then, the management server 202 creates the candidate related information list that reflects the result of S52 (S53). That is, if there is related information corresponding to an image index, the related information is added to a position of the image index corresponding to the related information on the candidate related information list. If there is no related information corresponding to an image index, information that "there is no related information" is added to the position of the image index on the candidate related information list.

If no similar document is found in S34 illustrated in FIG. 22(a), or no related information corresponding to image indexes on the candidate image index list is stored in the management server 202 in S37 illustrated in FIG. 22(a), the control section 41 may control a display panel 44 to display information of such a result, so as to require a user to input related information.

Further, if only one reference image data is found as the reference image data having the number of the votes equal to or more than the threshold value TH, the display panel 44 may not display the candidate related information list in S38, and the related information of the reference image data may be added to the input image data in S39.

The image processing system 200 performs the processing described above for every input image data inputted into the image processing apparatus 201, so that it becomes possible to appropriately add related information corresponding to the input image data to the input image data. This realizes an accurate search for the image data (input image data) stored, for example, in the shared server, on the basis of the related information, for example.

In the arrangement of the present embodiment, the management server 202 manages image indexes and related information so that the image indexes and corresponding related information are associated with each other. Further, the related information obtaining process section 43 obtains, from the management server 202, the related information that corresponds to the image index. However, it is possible to have another arrangement in which the management server 202 is not used. In this case, image index/related information associated information, which indicates a relationship between image indexes and corresponding related information, is stored in the memory 3. The related information obtaining process section 43 obtains the related information from the memory 3, and the control section 41 creates the candidate related information list based on the related information, for example.

The image processing systems 100 or 200 described in the foregoing embodiments can change related information that has been already stored. Here, the following explains two cases, that is, a case where related information that has been already stored is changed by directly accessing the management server 102 or 202, and another case where related information that has been already stored is changed by operating the image processing apparatus 101 or 201.

(1) Related Information Changed by Directly Accessing Management Server

The management server 102 or 202 manages related information and reference image data (image indexes) so that the related information and corresponding reference image data are associated with each other, as illustrated in FIG. 13. Here, in a case where an administrator (user) wants to change the related information of an image index ID2 from "person in charge A" into "person in charge C", or wants to add "person in charge C" to the related information, the administrator carries out the following operation.

The administrator (user) accesses the management server 102 or 202 from a user's terminal device (computer) via a network, so as to change "person in charge A" into "person in charge C", or add "person in charge C" to the related information. If the processing is carried out, the related information that will be embedded in input image data is the related information that has been changed in the processing.

(2) Related Information Changed by Operating Image Processing Apparatus.

Here, the following explains a case where the image processing apparatus 101 or 201 is provided to the digital color multifunction printer 103. The management server 102 or 202 manages related information and reference image data (image indexes) so that the related information and corresponding related information are associated with each other, as illustrated in FIG. 13.

Here, in a case where an administrator (user) wants to change the related information of the image index ID2 from "person in charge A" into "person in charge C", or wants to add "person in charge C" to the related information, the administrator operates, for example, the digital color multifunction printer 103 illustrated in FIG. 2, via an operation panel 115, as described below. The administrator (user) sets the digital color multifunction printer 103 (image processing apparatus 101 or 201) to be in a related information changing mode, and inputs image data corresponding to the image index ID2. The image data is inputted such that a color image input apparatus 111, which functions as a scanner, reads a document image, for example.

The image data inputted into the image processing apparatus 101 or 201 is processed through the feature point calculation section 11, the features calculation section 12, the voting process section 13, and the similarity determination process section 14 or 42, as in the matching mode. Then, if the similarity determination process section 14 or 42 determines there is a similarity, the related information obtaining process section 16 or 43 obtains related information corresponding to an image index of the reference image data. After that, the control section 1 or 41 controls the display section of the operation panel 115 to display the related information thus obtained.

Next, the administrator (user) cancels, changes, or adds the related information, while looking at the related information displayed at the display section. Then, the administrator inputs an instruction to store again the related information that reflects the above change. Based on the instruction, the related information that has been stored in the management server 102 or 202 as shown in FIG. 13, is changed by, for example, operation of the control section 1 or 41. If this processing is carried out, the related information that will be embedded in input image data is the related information that has been changed in the processing.

Further, the image processing system 100 or 200 of the present embodiment can change the related information that has been already embedded in image data (such as image data stored in the shared server) by reflecting the change in the related information stored in the management server 102 or 202. The management server 102 or 202 manages a change history of the related information, as shown in FIG. 23. This change history is a result of the change in the related information in the processing (1) or (2), as described above. For example, FIG. 23 shows that "estimate sheet A", which is related information of a reference document A, was changed into "estimate sheet B" on Oct. 5, 2007.

Figure 24:
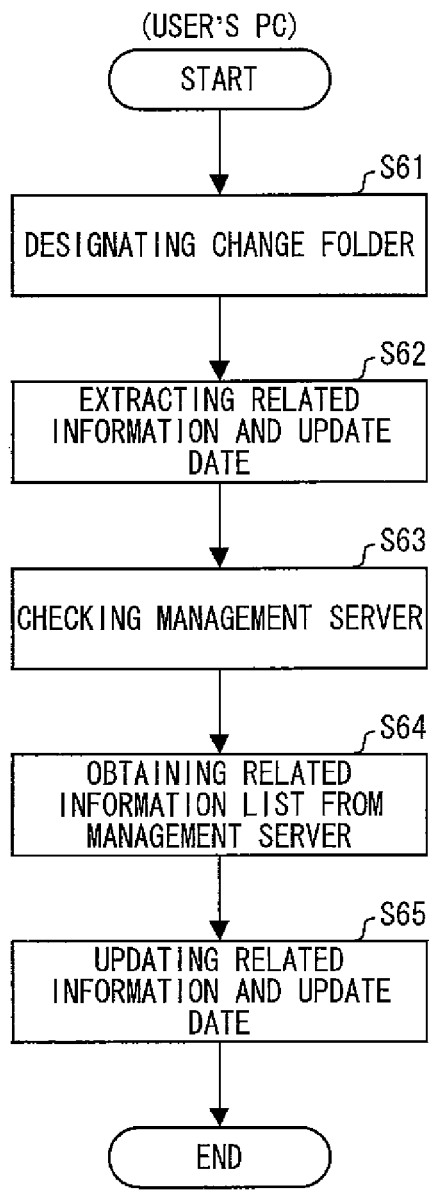
FIG. 24(a) is a flow chart illustrating operation for changing the related information embedded in image data, based on the change history of the related information, shown in FIG. 23.
FIG. 24(b) is a flow chart illustrating operation for changing the related information in the management server illustrated in FIG. 1.
Figure 24:
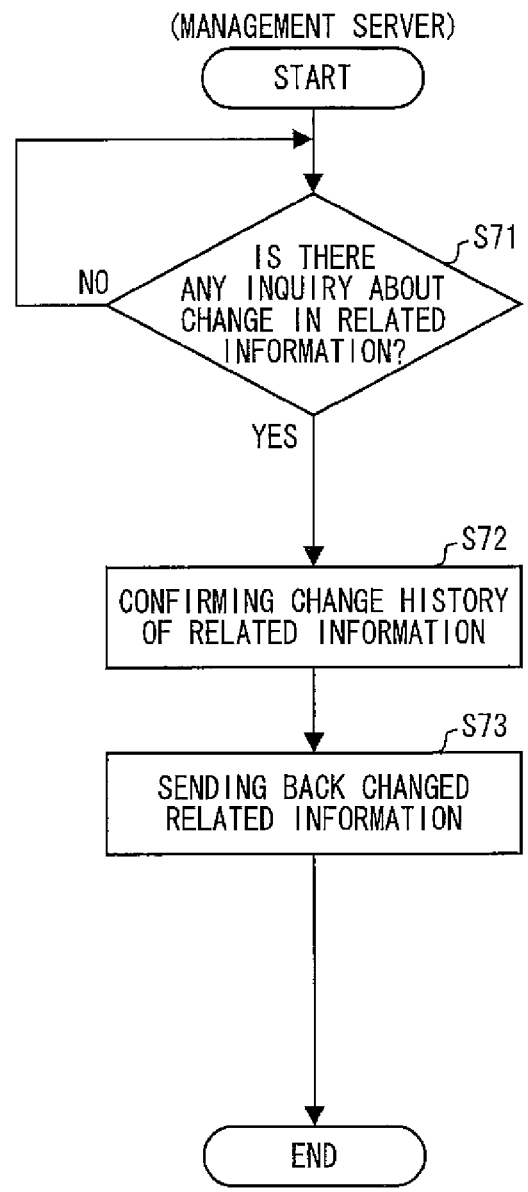

In a case where related information that has been embedded in image data (electronic document file) is changed, a user uses a dedicated application installed on a user's terminal device (computer), for example. In this case, the user's terminal device is included in the image processing system 100 or 200, as a related information updating section. The following explains operation to change related information in the present embodiment with reference to flow charts of FIGS. 24(*a*) and 24(*b*). FIG. 24(*a*) is a flow chart illustrating operation of the user's terminal device, in a case where the related information that has been embedded in image data (electronic document file) is changed, and FIG. 24(*b*) is a flow chart illustrating operation of the management server 102 or 202 along with the operation of the user's terminal device.

As illustrated in FIG. 24(*a*), in the case where the related information is changed, a user designates a folder in which image data (electronic document file) to which related information is added is stored (S61). The folder is a folder on a shared server, for example. With the operation of S61, the user's terminal device extracts the related information added to each image data in the folder, and change date information added to the related information (S62).

Next, the user's terminal device sends, to the management server 102 or 202, each of the related information and the change date information added to each of the related information thus extracted, and checks whether or not there has been a change in each of the related information after a date indicated by the change date information (S63).

As a result of the processing S63 (S64), if the user's terminal device receives, from the management server 102 or 202, the related information, which has been changed, the user's terminal device changes the related information of corresponding image data into the related information received in S64, as new related information, and finishes the processing (S65). In this case, the change date added to the changed related information is a change date managed by the management server 102 or 202.

Meanwhile, the management server 102 or 202 determines whether or not there is an inquiry regarding the change in the related information (S71). As a result of S71, if there is an inquiry regarding the change in the related information, based on the related information thus received and the change date information, the management server 102 or 202 extracts the related information that has been changed after the date indicated by the change date information (S72). Then, the management server 102 or 202 provides the related information thus extracted as new related information, adds a change date to the new related information, and sends the new related information to the user's terminal to finish the processing (S73).

In a case where a user knows that the related information has been changed, the following processing can be carried out in order to change the related information. That is, it is possible that a user (i) reads, by use of the user's terminal device, image data to which the related information has been added, which image data is stored in the shared server, for example, (ii) extracts, by using related information that has not been changed yet, as a keyword, target image data that has had a change in the related information, and (iii) changes the related information of the image data. The processing for changing the related information is carried out by use of the dedicated application, as described above.

Further, in the aforementioned example, a user uses the user's terminal device to change the related information that has been embedded in the image data. However, in a case where the related information is changed on the management server 102 or 202, or the like, it is possible to automatically change, for example, related information (stored in the shared server) of corresponding reference image data, based on the change in the related information.

For example, in a case where the management server 102 or 202 has a function (dedicated application) of the user's terminal device, and the related information managed by the management server 102 or 202 is changed, the series of processing illustrated in FIGS. 24(a) and 24(b) is automatically carried out without waiting for a user to input an instruction for the change. In this case, the management server 102 or 202 functions as the related information updating section.

Alternatively, in the image processing system 100 or 200 that does not include the management server 102 nor 202, the control section 1 or 41 manages related information in the memory 3, and has the function (dedicated application) of the user's terminal device. If the related information managed by the control section 1 or 41 is changed, the control section 1 or 41 automatically performs the series of the processing illustrated in FIGS. 24(a) and 24(b), without waiting for a user to input the instruction to change the related information. In this case, the control section 1 or 41 functions as the related information updating section.

In the examples above, the digital color multifunction printer 103 (image processing apparatus 101, image processing apparatus 102) includes a hash table, and image indexes and related information are stored in the management server 102 or 202 so that the image indexes and corresponding related information are associated with each other. However, it is possible to store, in the management server 102 or 202, both the hash table and the related information that corresponds to the image indexes respectively. In this case, the digital color multifunction printer 103 (image processing apparatus 101, image processing apparatus 102) sends features of the image data to the management server 102 or 202, and the management server 102 or 202 determines whether or not there is a similarity. If the management server 102 or 202 determines that there is a similarity, the related information is sent to the digital color multifunction printer 103 (image processing apparatus 102, image processing apparatus 202), and the digital color multifunction printer 103 (image processing apparatus 102, image processing apparatus 202) embeds the related information in the image data. An example of this arrangement is illustrated in FIG. 25.

Figure 25:
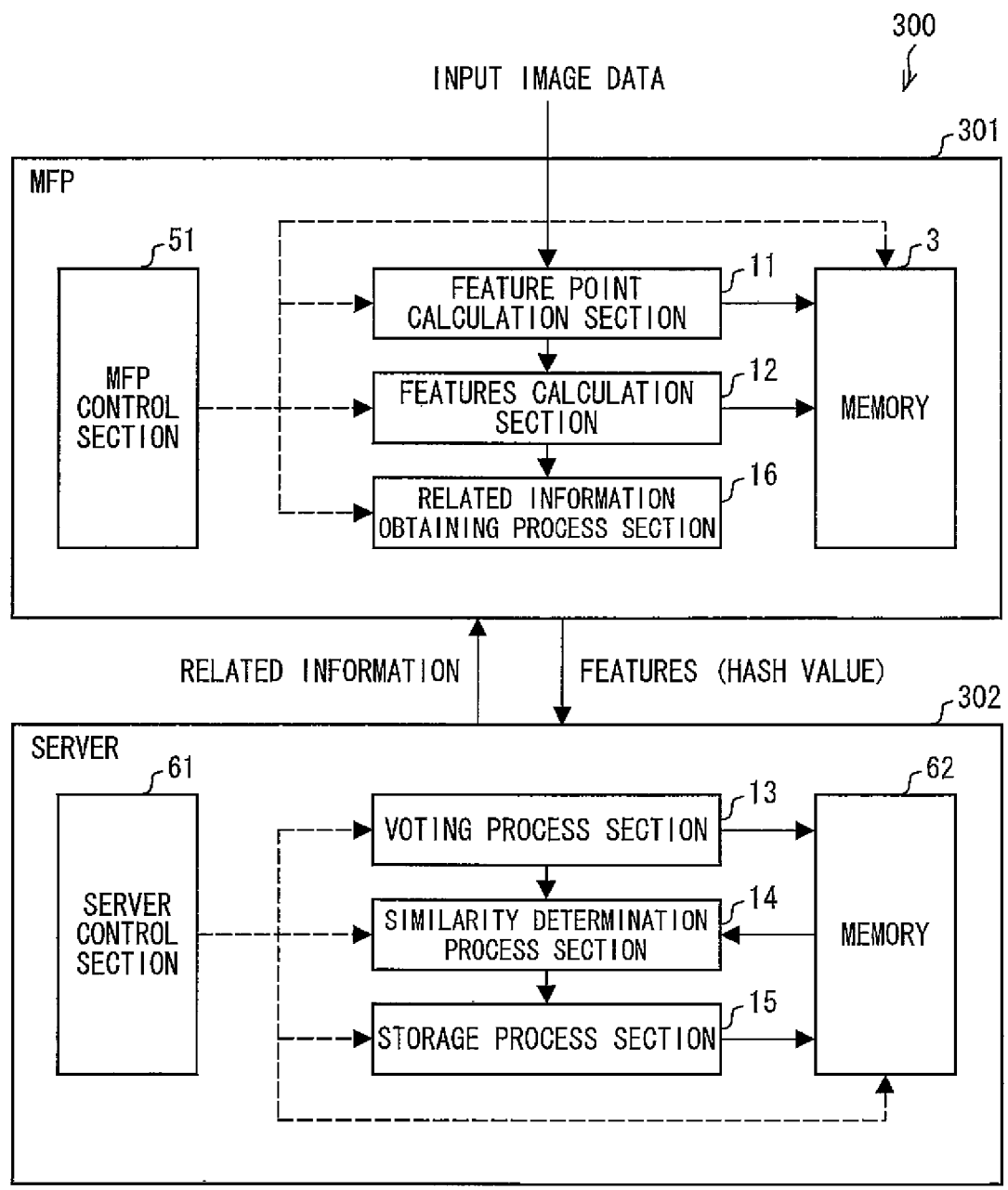
FIG. 25 is a block diagram illustrating an arrangement of an image processing system in accordance with still another embodiment of the present invention.

FIG. 25 is a block diagram illustrating an arrangement of an image processing system 300 in accordance with still another embodiment of the present invention. The image processing system 300 includes an image processing apparatus 301 and a management server 302. The image processing apparatus 301 corresponds to, for example, the digital color multifunction printer 103, and includes the feature point calculation section 11, the features calculation section 12, the related information obtaining process section 16, the memory 3, and an MFP control section 51. The MFP control section 51 controls operation of each section of the image processing apparatus 301, reading and writing operation with respect to the memory 3, and operation of communicating with a management server 302.

The management server 302 includes the voting process section 13, the similarity determination process section 14, the storage process section 15, a memory 62, and a server control section 61. The server control section 61 controls operation of each section of the management server 302, reading and writing operation with respect to the memory 62, and operation of communicating with the image processing apparatus 301. The operation of the image processing system 300 is the same as explained in each of the above examples.

Next, the following explains an arrangement of the digital color multifunction printer 103, to which the image processing apparatus 101, 201, or 301 is applied. FIG. 2 is a block diagram illustrating the arrangement of the digital color multifunction printer 103 having a copy function, a printer function, a fax-sending function, a scan to e-mail function, and the like.

Figure 2:
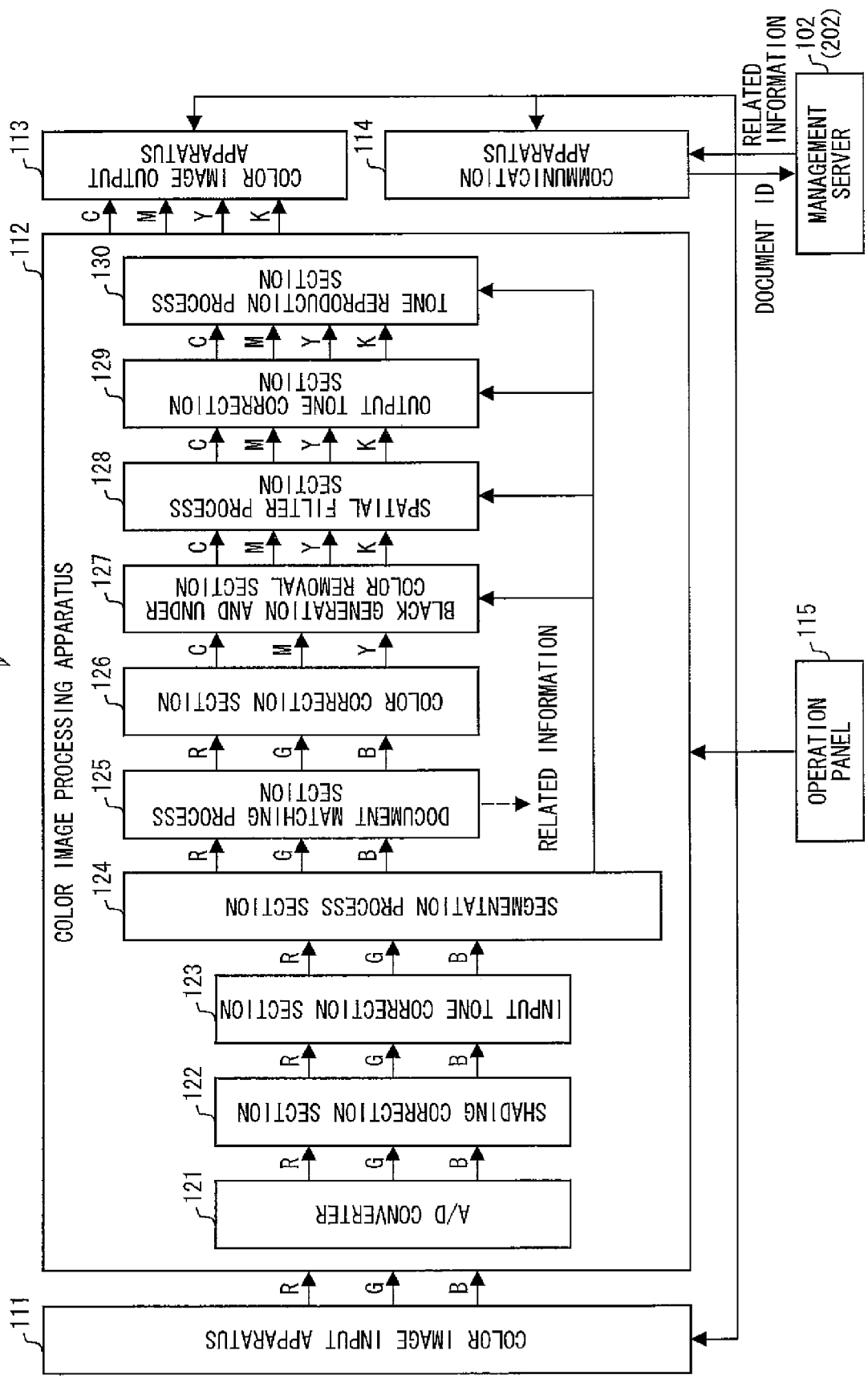
FIG. 2 is a block diagram illustrating an arrangement of a digital color multifunction printer including the image processing apparatus illustrated in FIG. 1.

As illustrated in FIG. 2, the digital color multifunction printer 103 includes a color image input apparatus 111, a color image processing apparatus 112, a color image output apparatus (image output apparatus) 113, and a communication device 114.

The color image input apparatus 111 is constituted by a scanner section which includes a device, such as a CCD, for converting optical information into an electrical signal. The color image input apparatus 111 outputs a reflected light image of a document as an analogue signal.

The analogue signal read by the color image input apparatus 111 is sent to, inside the color image processing apparatus 112, an A/D converter 121, a shading correction section 122, an input tone correction section 123, a segmentation process section 124, a document matching process section 125, a color correction section 126, a black generation and under color removal section 127, a spatial filter process section 128, an output tone correction section 129, and a tone reproduction process section 130, in this order, and is outputted to the color image output apparatus 113 as CMYK digital color signals.

The A/D converter 121 converts RGB analogue signals into digital signals. The shading correction section 122 carries out processing of removing, from the digital RGB signals received from the A/D converter 121, various distortions generated in an illumination system, an image focusing system, and an image sensing system of the color image input apparatus 111.

After various distortion is removed from the RGB signals in the shading correction section 122, the input tone correction section 123 carries out processing for adjusting a color balance of the RGB signals, and simultaneously, converting each of the RGB signals into a signal such as a density (pixel value) signal. Further, the input tone correction section 123 carries out processing for removing a base density and adjusting image quality such as contrast.

Based on the RGB signals, the segmentation process section 124 separates each pixel in an input image into either one of a text region, a halftone dot region, or a photograph (continuous tone) region. From a result of the separation, the segmentation process section 124 outputs a segmentation class signal, which indicates which segment a pixel belongs to, to the black generation and under color removal section 127, the special filter process section 128, and the tone reproduction process section 130, and simultaneously, outputs the input signal received from the input tone correction section 123 to the subsequent color correction section 126 without any modification.

The document matching process section 125 corresponds to the document matching process section 2 illustrated in FIG. 1. The document matching process section 125 is provided so as to follow the segmentation process section 124. However, the document matching process section 125 can be provided so as to be between the shading correction section 122 and the input tone correction section 123, or in parallel with the input tone correction section 123. In this case, the shading correction section 122 carries out the processing of adjusting the color balance, and converting the RGB digital signals into the density signals.

In order to realize a faithful color reproduction, the color correction section 126 performs processing of removing color impurity due to spectral characteristics of CMY color materials containing unnecessary absorption components.

The black generation and under color removal section 127 carries out (i) black generation processing for generating a black (K) signal from CMY three-color signals that have been color-corrected, and (ii) generation processing for generating new CMY signals by removing the K signal obtained in the black generation processing from the original CMY signals. This converts the CMY three-color signals into CMYK four-color signals.

With the use of a digital filter, the spatial filter process section 128 carries out spatial filter processing with respect to image data in the form of the CMYK signals received from the black generation and under color removal section 127, based on the segmentation class signal. In the spatial filter processing, the spatial filter process section 128 corrects spacial frequency characteristics, so as to reduce blur or granularity deterioration in an output image. The tone reproduction process section 130 carries out predetermined processing with respect to the image data in the form of the CMYK signals based on the segmentation class signal, as the spatial filter process section 128 does. The following describes the predetermined processing.

For example, in the region separated into a text region by the segmentation process section 124, the spatial filter process section 128 uses a spatial filter that strongly emphasizes a high frequency component, so as to enhance reproducibility of texts. Simultaneously, the tone reproduction process section 130 carries out binarization processing or multi-level dithering processing by using a high-resolution screen, which is suitable for reproducing the high-frequency component.

Further, in the region separated into a halftone dot region by the segmentation process section 124, the spatial filter process section 128 carries out low-pass filter processing for removing an input halftone dot component. Then, the output tone correction section 129 carries out output tone correction processing in which a signal, such as a density signal, is converted into a halftone dot area rate which is characteristics of the color image output apparatus 113. After that, the tone reproduction process section 130 carries out tone reproduction processing so that, ultimately, an image is segmented into pixels, and each tone of the pixels can be reproduced. In the region separated into a photograph region by the segmentation process section 124, the binarization processing or multi-level dithering processing is performed by use of a screen suitable for tone reproduction.

The image data which has been subjected to each of the processing above is temporarily stored in a storage device (not illustrated). The image data is read from the storage device at predetermined timing, and supplied to the color image output apparatus 113.

This color image output apparatus 113 outputs the image data to a recording medium, such as paper. The color image output apparatus 113 may be, but not limited to, a color image apparatus employing an electrophotographic technique or an inkjet technique. Each of the processing described above is controlled by a CPU (Central Processing Unit) (not illustrated).

The communication device 114 is constituted by a modem or a network card, for example. In a case of sending a FAX, the communication device 114 uses the modem so as to carry out a procedure in connection with a destination. When a state where a FAX can be sent is secured, the communication device 114 reads, out of a memory (not illustrated), image data (image data read by a scanner) which is compressed into a predetermined format, and then, carries out necessary processing, such as conversion of the compression format. After that, the communication device sequentially transmits the image data to the destination via a communication line.

Further, in a case where the communication device 114 receives a FAX, the CPU (not illustrated) performs a communication procedure. Simultaneously, the CPU receives image data sent from an originating communication device and inputs the image data into the image processing apparatus 112. The image processing apparatus 112 carries out decompression processing (not illustrated) to decompress the received image data in a compression/decompression process section (not illustrated). The image data decompressed is subjected to a rotation process or a resolution conversion process, if necessary, and then, is subjected to an output tone correction process and a tone reproduction process. After that, the image data is outputted from the color image output apparatus 113.

Further, the communication device 114 communicates with a computer or other digital multifunction printer connected with a network via a network card or a LAN cable.

The foregoing example deals with the digital color multifunction printer 103, however, the multifunction printer 103 may be a black-and-white multifunction printer.

Figure 26:
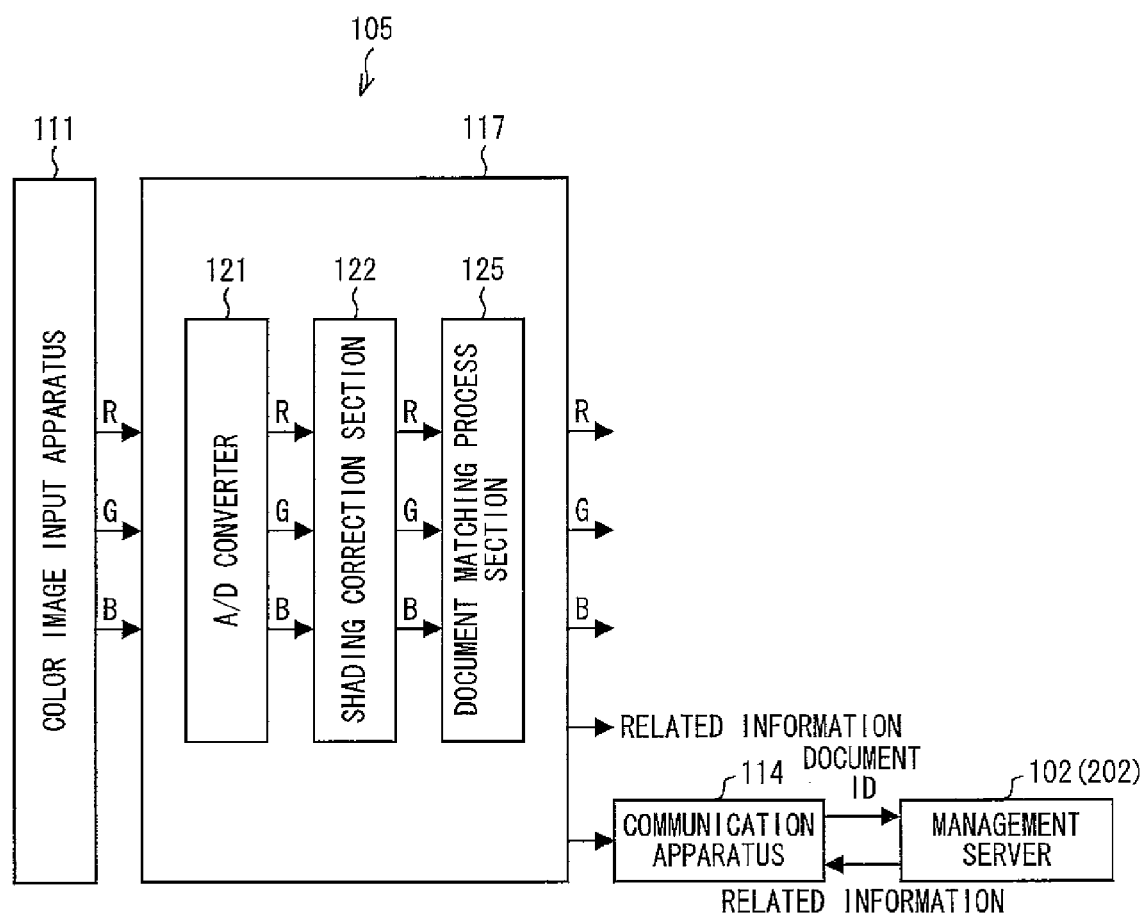
FIG. 26 is a block diagram illustrating an arrangement of a color image reading apparatus to which the image processing apparatus in accordance with any of the embodiments of the present invention is applied.

Furthermore, any one of the image processing apparatuses 101, 201, and 301 in accordance with the present embodiment is applicable to an image reading apparatus. FIG. 26 is a block diagram illustrating an arrangement of a color image reading apparatus (image processing apparatus) 105 to which the image processing apparatus 101, 201, or 301 in accordance with the present embodiment is applied. The color image reading apparatus (image reading apparatus) 105 is, for example, a flatbed scanner.

As illustrated in FIG. 26, the color image reading apparatus 105 includes an image processing section 117 including the A/D converter 121, the shading correction section 122, and the document matching process section 125. The image processing section 117 is arranged to be connected to the color image input apparatus 111 and the communication device 114.

Each section of the image processing apparatus 117, and the color image input apparatus 111 have the same arrangements and functions as described above. The image processing section 117 communicates with the management server 102 or 202 via the communication device 114. Details of operation of the image processing section 117, and operation of the image processing system including the management server 102 or 202 are the same as described above.

The present invention can be realized by storing an image processing method for performing the aforementioned document matching process and output control process in a computer-readable storage medium in which a program code (executable program, intermediate code program, source program) for causing a computer to carry out a program is stored. Therefore, it is possible to provide a portable storage medium in which the program code for carrying out the image processing method for performing the document matching process and output control process is stored.

It should be noted that in the present embodiment, the storage medium (program medium) may be a memory (not illustrated) used in processing of a microcomputer, such as a ROM, or may be a program medium which can be read by being inserted into a program reading apparatus, which is provided as an external storage apparatus (not illustrated).

In any cases, the program code stored in a storage medium may be arranged such that a microprocessor accesses the program code to perform the image processing method. Alternatively, in any cases, the program code may be arranged such that the program code is read, and downloaded to a program storing area (not illustrated) of a microcomputer, and then, the program code is carried out. A program for downloading the program code should be stored in a main apparatus in advance.

Here, the program medium may be a storage medium that is arranged separable from the main apparatus. The program medium may be a medium in which a program code is stored and fixed, such as: a tape (a magnetic tape or a cassette tape, for example); a disc, such as a magnetic disk (a Floppy® disk, or a hard disk, for example) and an optical disk (a CD-ROM, an MO, an MD, and a DVD, for example); a card (an IC card (including a memory card) and an optical card, for example); and a semiconductor memory (a mask ROM, an EPROM (Erasable Programmable Read Only Memory), an EEPROM (Electrically Erasable Programmable Read Only Memory), and a flash ROM, for example).

Further, the image processing system of the present embodiment can be connected to a communication network including the Internet. Accordingly, the storage medium can be a medium in which the program code is stored movable. For example, the program code can be downloaded to the storage medium from a communication network. In a case where the program code is downloaded from the communication network, the program for downloading the program code may be stored in the main apparatus in advance, or may be installed from another storage medium. Further, the present invention can be realized in a form of a computer data signal that is realized by electrically-transmitting the program code, and embedding the program code in a carrier wave.

The storage medium is read by a program reading apparatus provided to a digital color image forming apparatus or a computer system, so that the image processing method described above is carried out.

Further, the computer system is constituted by: an image input apparatus such as a flatbed scanner, a film scanner, and a digital camera; a computer for executing various processes, such as the image processing method, by loading a predetermined program; an image display apparatus for displaying a result of processing of the computer, such as a CRT display and a liquid crystal display; and a printer for outputting the result of the processing of the computer on paper or the like. Furthermore, the computer system is provided with a network card or a modem as communication means for connecting the computer system to a server or the like via a network.

As described above, in the image processing apparatus of the present invention, the related information storage means stores a plurality of related information which are set with respect to a plurality of reference image data, respectively, the plurality of related information regarding the plurality of reference image data, respectively, and in a case where the determination section determines that there is a similarity between the input image data and a first reference image data among the plurality of reference image data, the related information obtaining section obtains related information set with respect to the first reference image data from the related information storage means. In a case where there are a plurality of reference image data, the first reference image data is one of the reference image data.

With the arrangement, if the determination section determines that there is a similarity between the input image data and the first reference image data among a plurality of reference image data, the related information obtaining section obtains the related information set with respect to the first reference image data from the related information storage means. The related information adding section adds the related information thus obtained to the input image data. Thereby, it is possible to appropriately add related information to each input image data.

In the image processing apparatus, the related information is stored in the related information storage means so that it is associated with features of the reference image data, the determination section including: a features extraction section for extracting features from the input image data; and a similarity determination section for carrying out a comparison of the features extracted from the input image data by the features extraction section with features of the reference image data stored in the related information storage means, and for determining based on the comparison whether or not there is a similarity between the input image data and the reference image data.

With the arrangement, the features extraction section of the determination section extracts the features from the input image data, and the similarity determination section of the determination section compares the features of the input image data, extracted by the features extraction section, with the features of the reference image data stored in the related information storage means so as to determine whether or not there is a similarity between the input image data and the reference image data. If the similarity determination section determines that there is a similarity between the input image data and the reference image data, the related information obtaining section obtains related information from the related information storage section, and the related information adding section adds the related information thus obtained to the input image data.

This makes it possible to add appropriate related information, such as related information based on a sort of an image indicated by the image data, to the inputted image data. Therefore, on the basis of the related information, an accurate search for each image data can be realized.

In the image processing apparatus, the related information storage means may store an image index for distinguishing among the plurality of reference image data, and the related information set with respect to the reference image data identified by the image index, in association with each other, and in a case where the determination section determines that there is the similarity between the input image data and the first reference image data among the plurality of reference image data, the related information obtaining section (i) may send the image index set with respect to the first reference image data to the related information storage section, and (ii)

obtain, from the related information storage means, related information associated with the image index sent.

With the arrangement, if the determination section determines that there is a similarity between the input image data and the first reference image data among the plurality of reference image data, the related information obtaining section sends the image index set with respect to the first reference image data to the related information storage means, and obtains, from the related information storage means, the related information associated with the image index thus sent. The related information adding section adds the related information thus obtained to the input image data. Thereby, it becomes possible to add appropriate related information, such as related information based on a sort of an image indicated by the image data, to the inputted image data. Therefore, on the basis of the related information, an accurate search for each image data can be realized.

The image processing apparatus of the present invention further includes a display control section for controlling display means to display the related information obtained by the related information obtaining section, wherein: the related information storage means stores (i) a plurality of related information which are set with respect to a plurality of reference image data, respectively, the plurality of related information regarding the plurality of reference image data, respectively, and (ii) in a case where any of the plurality of the related information has been changed, change history information indicating that change history is stored, and the related information adding section adds, to the input image data, related information being selected from among a plurality of related information displayed by the display means, based on an input to select related information to be added to the input image data.

With the arrangement, the determination section determines whether or not there is a similarity between the input image data and the reference image data. If the determination section determines that there is a similarity between the input image data and the reference image data, the related information obtaining section obtains related information from the related information storage means in which related information set with respect to the reference image data is stored. The display control section controls display means, such as display means connected to the image processing apparatus, or display means of a user's terminal device (computer) connected to the image processing apparatus via a network, to display the related information obtained by the related information obtaining section. In this case, it is possible to control the display means to display an instruction so that a user selects which related information will be added to the input image data. After a user selects and inputs related information in accordance with the display of the display means to add the related information to the input image data, the related information adding section adds the related information to the input image data based on the user's inputted selection.

Thereby, even if there are a plurality of reference image data similar to the input image data, a user can add appropriate information, such as related information based on a sort of an image indicated by the image data, to the inputted image data. Therefore, an accurate search for each image data can be realized on the basis of the related information.

Further, if the related information stored in the related information storage means is changed, the related information updating section updates, based on the change history information indicating the change, the related information of the input image data to which the related information has been added by the related information adding section.

Thereby, even if the related information stored in the related information storage means is changed, it is possible to reflect the change to the related information of the input image data to which the related information has been added. Therefore, based on the changed related information, it becomes possible to successfully search for the input image data to which the related information was added before the related information stored in the related information storage means was changed.

An image processing system of the present invention includes: an image processing apparatus; and a management apparatus which can communicate with the image processing apparatus, said management apparatus storing (i) a plurality of related information which are set with respect to a plurality of reference image data, respectively, and (ii) change history information indicating that change history in a case where any of the related information has been changed, said image processing apparatus comprising: a determination section for determining whether or not there is a similarity between input image data and reference image data; a related information obtaining section for obtaining, from the management apparatus, related information set with respect to a first reference image data, in a case where the determination section determines that there is a similarity between the input image data and the first reference image data among the plurality of reference image data; a related information adding section for adding the related information obtained by the related information obtaining section to the input image data; and a related information updating section for updating, based on the change history information, related information of the input image data to which the related information has been added by the related information adding section.

With the arrangement, in the image processing apparatus, the determination section determines whether or not there is a similarity between the input image data and the reference image data. If the determination section determines that there is a similarity between the input image data and the first reference image data among the plurality of reference data, the related information obtaining section communicates with the management server to obtain the related information set with respect to the reference image data. The related information adding section adds the related information obtained by the related information obtaining section to the input image data.

Thereby, it is possible to add appropriate related information, such as related information based on a sort of an image indicated by the image data, to the inputted image data. Therefore, an accurate search for each image data can be realized on the basis of related information.

Further, if related information stored in the related information storage means is changed, the related information updating section updates, based on the change history information indicating the change, the related information of the input image data to which the related information has been added by the related information adding section.

Thereby, even if the related information stored in the related information storage means is changed, it is possible to reflect the change to the related information of the input image data to which the related information has been added. Therefore, based on the changed related information, it becomes possible to successfully search for the input image data to which the related information was added before the related information stored in the related information storage means was changed.

In the image processing system, said management apparatus may store an image index for distinguishing among the plurality of reference image data, and the related information set with respect to reference image data identified by the image index, in association with each other, and in a case where the determination section determines that there is a similarity between the input image data and the first reference image data among the plurality of reference image data, the related information obtaining section may send the image index set with respect to the first reference image data to the management apparatus, and obtains, from the management apparatus, related information associated with the image index sent.

With the arrangement, in the image processing apparatus, if the determination section determines that there is a similarity between the input image data and the first reference image data among the plurality of reference image data, the related information obtaining section sends the image index set with respect to the first reference image data to the management apparatus, and obtains, from the management apparatus, the related information associated with the image index thus sent. The related information adding section adds the related information thus obtained to the input image data. Thereby, it is possible to add appropriate related information, such as related information based on a sort of an image indicated by the image data, to the inputted image data. Therefore, an accurate search for each image data can be realized on the basis of the related information.

An image reading apparatus of the present invention includes: an image input apparatus for reading an image of a document so as to obtain image data; and any of said image processing apparatus for processing the image data supplied from the image input apparatus.

Further, an image forming apparatus of the present invention includes: an image input apparatus for reading an image of a document so as to obtain image data; any of said image processing apparatus for processing the image data supplied from the image input apparatus; and an image output apparatus for carrying out printing based on the image data.

With the arrangement, it becomes possible for the image reading apparatus and the image forming apparatus to appropriately add related information to the image data obtained by reading a document image by the image input apparatus. The image input apparatus is included in either the image reading apparatus or the image forming apparatus, and the related information is used to search for the image data.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image processing apparatus comprising:
    related information storage means in which (i) related information set with respect to reference image data is stored, and (ii) in a case where the related information has been changed, change history information indicating that change history is stored;
    a determination section for determining whether or not there is a similarity between input image data and the reference image data;
    a related information obtaining section for obtaining the related information from the related information storage means in a case where the determination section determines that there is a similarity between the input image data and the reference image data;
    a related information adding section for adding the related information obtained by the related information obtaining section to the input image data; and
    related information updating section for updating, based on the change history information, related information of the input image data to which related information has been added by the related information adding section.

2. The image processing apparatus according to claim 1, wherein:
    the related information storage means stores a plurality of related information which are set with respect to a plurality of reference image data, respectively, the plurality of related information regarding the plurality of reference image data, respectively, and
    in a case where the determination section determines that there is a similarity between the input image data and a first reference image data among the plurality of reference image data, the related information obtaining section obtains related information set with respect to the first reference image data from the related information storage means.

3. The image processing apparatus according to claim 1, wherein:
    the related information is stored in the related information storage means so that it is associated with features of the reference image data,
    the determination section including:
    a features extraction section for extracting features from the input image data; and
    a similarity determination section for carrying out a comparison of the features extracted from the input image data by the features extraction section with features of the reference image data stored in the related information storage means, and for determining based on the comparison whether or not there is a similarity between the input image data and the reference image data.

4. The image processing apparatus according to claim 2, wherein:
    the related information storage means stores an image index for distinguishing among the plurality of reference image data, and the related information set with respect to the reference image data identified by the image index, in association with each other, and
    in a case where the determination section determines that there is the similarity between the input image data and the first reference image data among the plurality of reference image data, the related information obtaining section (i) sends the image index set with respect to the first reference image data to the related information storage section, and (ii) obtains, from the related information storage means, related information associated with the image index sent.

5. The image processing apparatus according to claim 1, further comprising a display control section for controlling display means to display the related information obtained by the related information obtaining section, wherein:
    the related information storage means stores (i) a plurality of related information which are set with respect to a plurality of reference image data, respectively, the plurality of related information regarding the plurality of reference image data, respectively, and (ii) in a case where any of the plurality of the related information has been changed, change history information indicating that change history is stored, and the related information adding section adds, to the input image data, related information being selected from among a plurality of related information displayed by the display means, based on an input to select related information to be added to the input image data.

6. The image processing apparatus according to claim 1, wherein:
the reference image data is image data having a fixed form.

7. The image processing apparatus according to claim 1, wherein:
the related information is information indicating a type of the reference image data, or information related to the reference image data.

8. An image reading apparatus comprising:
an image input apparatus for reading an image of a document so as to obtain image data; and
an image processing apparatus according to claim 1, said image processing apparatus processing the image data supplied from the image input apparatus.

9. An image forming apparatus comprising:
an image input apparatus for reading an image of a document so as to obtain image data;
an image processing apparatus according to claim 1, said image processing apparatus processing the image data supplied from the image input apparatus; and
an image output apparatus for carrying out printing based on the image data.

10. A non-transitory computer-readable storage medium in which a program for causing a computer to function as each of said sections of an image processing apparatus according to claim 1.

11. An image processing system comprising:
an image processing apparatus; and
a management apparatus which can communicate with the image processing apparatus,
said management apparatus storing (i) a plurality of related information which are set with respect to a plurality of reference image data, respectively, and (ii) change history information indicating that change history in a case where any of the related information has been changed,
said image processing apparatus comprising:
a determination section for determining whether or not there is a similarity between input image data and reference image data;
a related information obtaining section for obtaining, from the management apparatus, related information set with respect to a first reference image data, in a case where the determination section determines that there is a similarity between the input image data and the first reference image data among the plurality of reference image data;
a related information adding section for adding the related information obtained by the related information obtaining section to the input image data; and
a related information updating section for updating, based on the change history information, related information of the input image data to which the related information has been added by the related information adding section.

12. The image processing system according to claim 11, wherein:
said management apparatus stores an image index for distinguishing among the plurality of reference image data, and the related information set with respect to reference image data identified by the image index, in association with each other, and
in a case where the determination section determines that there is a similarity between the input image data and the first reference image data among the plurality of reference image data, the related information obtaining section sends the image index set with respect to the first reference image data to the management apparatus, and obtains, from the management apparatus, related information associated with the image index sent.

13. The image processing system according to claim 11, wherein:
the reference image data is image data having a fixed form.

14. The image processing system according to claim 11, wherein:
the related information is information indicating a type of the reference image data, or information related to the reference image data.

15. An image processing method comprising the steps of:
(a) determining whether or not there is a similarity between input image data and reference image data;
(b) obtaining, when the similarity between the input image data and the reference image data exists in the step (a), related information from related information storage means in which (i) related information set with respect to reference image data is stored, and (ii) in a case where the related information has been changed, change history information indicating that change history is stored;
(c) adding the related information obtained in the step (b) to the input image data; and
(d) updating, based on the change history information, related information of the input image data to which related information has been added in the step (c).

* * * * *